(12) United States Patent
Nixon et al.

(10) Patent No.: US 11,734,213 B2
(45) Date of Patent: Aug. 22, 2023

(54) INTEGRATION OF MULTIPLE COMMUNICATION PHYSICAL LAYERS AND PROTOCOLS IN A PROCESS CONTROL INPUT/OUTPUT DEVICE

(71) Applicant: FISHER-ROSEMOUNT SYSTEMS, INC., Round Rock, TX (US)

(72) Inventors: Mark J. Nixon, Round Rock, TX (US); Gary K. Law, Georgetown, TX (US); Sergio Diaz, Pflugerville, TX (US); Claudio Fayad, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 22 days.

(21) Appl. No.: 16/573,380

(22) Filed: Sep. 17, 2019

(65) Prior Publication Data
US 2021/0081346 A1     Mar. 18, 2021

(51) Int. Cl.
*G06F 13/40*     (2006.01)
*H04L 69/323*     (2022.01)
(Continued)

(52) U.S. Cl.
CPC ..... *G06F 13/4027* (2013.01); *G05B 19/4186* (2013.01); *G06F 1/26* (2013.01);
(Continued)

(58) Field of Classification Search
None
See application file for complete search history.

(56) References Cited

U.S. PATENT DOCUMENTS 7,580,409 B1 * 8/2009 Swenson ............... H04L 49/253
370/392
7,684,875 B2 3/2010 Jundt et al.
(Continued)

FOREIGN PATENT DOCUMENTS

GB    2 557 726 A    6/2018
GB    2 578 821 A    5/2020

OTHER PUBLICATIONS

Suzanne Gill, "Ethernet moves closer to process controls", Control Engineering Europe, Sep. 30, 2018, p. 1-3, https://www.controleng.com/articles/ethernet-moves-closer-to-process-controls/ (Year: 2018).*
(Continued)

*Primary Examiner* — Farley Abad
*Assistant Examiner* — Dayton Lewis-Taylor
(74) *Attorney, Agent, or Firm* — Marshall, Gerstein & Borun LLP

(57) ABSTRACT

A process control input/output (I/O) device provides traditional I/O support with direct physical layers or interfaces associated with traditional process control communication protocols while at the same time supporting an advanced physical layer or other IP based physical layer and the communication protocols that run on top of them. In addition, the new I/O device is able to nest protocols inside of other protocols for use when protocols, such as safety protocols, require additional handshaking, confirmations, etc. Still further, the new I/O device includes hardware configurable capabilities that enable easy configuration of a process control system that uses multiple different physical layers, including those used by traditional process control protocols such as HART and FOUNDATION Fieldbus protocols, and more advanced physical layers, including those that are used by IP-based, Ethernet based, packet based and other types of advanced communication protocols.

89 Claims, 10 Drawing Sheets

(51) Int. Cl.
    *G06F 1/26*       (2006.01)
    *G05B 19/418*    (2006.01)

(52) U.S. Cl.
    CPC ........ *G06F 13/4022* (2013.01); *H04L 69/323* (2013.01); *G05B 2219/31184* (2013.01)

(56) References Cited

U.S. PATENT DOCUMENTS

| | | |
|---|---|---|
| 8,332,567 B2 | 12/2012 | Burr et al. |
| 8,762,618 B2 | 6/2014 | Burr et al. |
| 8,977,851 B2 | 3/2015 | Neitzel et al. |
| 9,083,548 B2 | 7/2015 | Holmes et al. |
| 9,411,769 B2 | 8/2016 | Erni et al. |
| 9,495,313 B2 | 11/2016 | Burr et al. |
| 9,753,439 B2 | 9/2017 | Armstrong et al. |
| 10,579,558 B1 | 3/2020 | Sundaresh et al. |
| 2013/0070717 A1* | 3/2013 | Elsterer ................... H04L 69/12 370/329 |
| 2014/0149630 A1 | 5/2014 | Burr et al. |
| 2015/0009995 A1* | 1/2015 | Gross, IV ........... H04L 12/4633 370/392 |
| 2015/0127876 A1* | 5/2015 | Emi ....................... G05B 15/02 710/315 |
| 2018/0113830 A1 | 4/2018 | Sherriff et al. |

OTHER PUBLICATIONS

Search Report for Application No. GB2013796.4, dated Jan. 27, 2021.

FieldComm Group, "Hart-IP; Hart at the Speed of Ethernet," (2021).

\* cited by examiner

INTEGRATION OF MULTIPLE COMMUNICATION PHYSICAL LAYERS AND PROTOCOLS IN A PROCESS CONTROL INPUT/OUTPUT DEVICE

TECHNICAL FIELD

The present application relates generally to process control systems and, more particularly, to communicatively coupling field devices to process controllers in a process control system using multiple physical layers that support different communication protocols.

BACKGROUND

Distributed process control systems, like those used in chemical, petroleum, industrial or other process plants to manufacture, refine, transform, generate, or produce physical materials or products, typically include one or more process controllers communicatively coupled to one or more field devices via physical layers that may be analog, digital or combined analog/digital buses, or that may include one or more wireless communication links or networks. The field devices, which may be, for example, valves, valve positioners, switches and transmitters (e.g., temperature, pressure, level and flow rate sensors), are located within the process environment and generally perform physical process control functions such as opening or closing valves, measuring process and/or environmental parameters such as flow, temperature or pressure, etc. to control one or more processes executing within the process plant or system. Smart field devices, such as the field devices conforming to the well-known FOUNDATION® Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a control application that runs, for example, different control modules which make process control decisions, generate process control signals based on the received information and coordinate with the control modules or blocks being performed in the field devices, such as HART®, WirelessHART®, and FOUNDATION® Fieldbus field devices. To perform this communication, the control modules in the process controller send the control signals to various different input/output (I/O) devices, which then send these control signals over communication lines or links (communication physical layers) to the actual field devices to thereby control the operation of at least a portion of the process plant or system, e.g., to control at least a portion of one or more industrial processes running or executing within the plant or system. The I/O devices, which are also typically located within the plant environment, are generally disposed between a process controller and one or more field devices, and enable communications there-between, e.g., by converting electrical signals into digital values and vice versa. Different I/O devices are provided to support field devices that use different communication protocols. More particularly, a different I/O device is provided between a process controller and each of the field devices that use a particular communication protocol, such that a first I/O device is used to support HART field devices, a second I/O device is used to support Fieldbus field devices, a third I/O device is used to support Profibus field devices, etc. As utilized herein, field devices, controllers, and I/O devices are generally referred to as "process control devices," and are generally located, disposed, or installed in a field environment of a process control system or plant.

Still further, information from the field devices and the process controller is usually made available over a data highway or communication network to one or more other hardware devices, such as operator workstations, personal computers or computing devices, data historians, report generators, centralized databases, or other centralized administrative computing devices that are typically placed in control rooms or other locations away from the harsher field environment of the plant, e.g., in a back-end environment of the process plant. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing process control software, keeping and updating a configuration database, etc. The data highway utilized by the hardware devices and process controllers may include a wired communication path, a wireless communication path, or a combination of wired and wireless communication paths and typically uses a packet based communication protocol and non-time sensitive communication protocol, such as an Ethernet or IP protocol.

As an example, the DeltaV™ control system, sold by Emerson Automation Solutions, includes multiple applications stored within and executed by different devices located at diverse places within a process plant. A configuration application, which resides in one or more workstations or computing devices in a back-end environment of a process control system or plant, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, a maintenance view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As indicated above, a process control system can include a plurality of field devices that provide many different functional capabilities within a plant, and these field devices are communicatively coupled to process controllers using one of various different types of physical interfaces or physical layers of a communication interface. For example, a common process control communication physical interface uses a two-wire interface set up in either a point-to-point wiring connection arrangement (e.g., only one field device communicatively coupled to a particular wire interface) or in a multi-drop wiring connection arrangement (e.g., a plurality of field devices communicatively coupled to a wire interface). However, some field devices may be connected with a controller using wireless communications physical layer which may include wireless gateway and transmitter/receiver devices. Still further field devices are typically configured to communicate with the process controllers using one of various different communication protocols. These communication protocols are typically digital signal protocols but can be analog protocols (e.g., the 4-20 ma protocol) or combined digital and analog protocols (e.g., the HART protocol). Some of these protocols operate using relatively simple commands and/or communications (e.g., an ON command and an OFF command as used in the CAN protocol), while other protocols are more complex requiring more commands and/or more communication information, which may or may not include simple commands. For example, more complex protocols may communicate analog values with digital communications superimposed on the analog value using, for example, a Highway Addressable Remote Transducer (HART®) communication protocol. Other field devices can use entirely digital communications (e.g., a FOUNDATION® Fieldbus communication protocol) that provides many types of communications. Other process control communication protocols include the PROFIBUS communication protocol, although still other process control communication protocols have been developed and are being used as well. Each of these communication protocols calls for, or needs to be supported by a particular physical layer, which may include a two-wire, a four wire, etc. physical layer, particular switches, etc. Moreover, the physical layer may specify maximum or minimum wire lengths, wire thicknesses, wire types, termination types, other electrical characteristics, etc.

As a result of the development of these various field device communication protocols, each of which typically uses different communication wiring (physical layers) and signaling formats, various different field devices (e.g., field devices that use the different protocols) are communicatively connected to the process controller via different input/output devices (I/O devices), with each different I/O device conforming to a different one of the process control protocols and supporting a particular type of physical layer. That is, a typical plant may have a controller coupled to multiple different I/O devices including a Fieldbus I/O device (which in turn couples to one or more FOUNDATION Fieldbus field devices via a FOUNDATION Fieldbus compliant two-wire or four-wire bus), a HART I/O device which couples to each of one or more HART compliant field devices via a separate two-wire or four wire single drop connection, a CAN I/O device which couples to one or more CAN compliant field devices via a CAN compliant wiring connection, and so on.

Additionally, coupling the communication ports of field devices to a terminal block of an I/O device and, eventually, to a process controller in the process plant is generally a complex process. Field devices must be coupled to I/O cards that translate the signals received from the field devices to signals that can be processed by the process controllers and that translate the signals received from the controllers to signals that can be processed by the field devices. As a result, each channel of each I/O card, corresponding to a particular field device, must be associated with the appropriate signal types (so that signals are processed appropriately by the I/O card) and the I/O card must be communicatively coupled to the controller or controllers that will eventually be receiving signals from and/or sending signals to the field devices coupled to that I/O card.

As noted above, each field device is coupled to an I/O device using a particular communication medium or physical layer (e.g., a two-wire cable, a wireless link, or an optical fiber) via a terminal block on the I/O device, and further using one of the above or other specialized process control communication protocols (HART, CAN, WirelessHART, FOUNDATION Fieldbus, PROFIBUS, etc.) that have been developed in the process control industry. Still further, the I/O device is separately connected to a process controller, typically via another bus or wired connection. The use of these different I/O devices means that the physical and logical connections between different field devices must be precisely mapped so that the controllers connected to different I/O device can track which field devices are connected to which port of each I/O device in order to communicate signals via the correct "path" to that field device. This problem is especially cumbersome in the HART protocol, in which each field device is connected to a different output port of a HART compliant I/O device.

To alleviate this configuration problem, a hardware configurable I/O device has been developed to be used with, for example, HART field devices and the HART physical layer. The hardware configurable I/O device includes a hardware configurable platform that connects various different HART field devices (and/or 4-20 ma devices that use the same physical layer as HART devices) to a controller. This hardware configurable I/O device includes a removable head-end processor that communicates via a first external bus to one or more process controllers and that communicates, via a second internal bus, to multiple different configurable I/O slots, each of which is connected to and associated with a different termination port (terminal block) of the I/O device. Moreover, each output port or terminal block is configured to be connected to a different field device via, for example, a two-wire or a four-wire HART compliant communication line or physical layer. The hardware configurable I/O device may also include a power supply that supplies power (for HART compliant devices) to each of the I/O slots via the same internal bus or via a second internal bus. Importantly, each I/O slot is adapted to receive a hardware module, referred to herein as an electronic marshalling component (EMC), that when inserted into the slot, connects the module on one side (an input side) with the head-end processor (via the internal communication bus within the I/O device) and the power supply (if present), and that connects the module on the other side (an output side) with one of the output ports or terminal blocks of the I/O device to which a HART compliant field device can be connected. The hardware module or EMC placed into each particular slot of the I/O device includes a processor and a memory that performs communications with the HART compliant field device connected via the output port using the HART communication protocol and this module operates to obtain configuration information and other information from the connected HART field device. The processor of the hardware module also communicates information about the detected HART compliant field device to the head end processor of the I/O device, which uses this information to associate the particular hardware slot of the I/O device with the detected field device. In this manner, insertion of the hardware module (along with operation of the internal processor thereof) enables any HART compliant field device to be coupled to any of the input/output ports of the I/O device and to be automatically detected and configured without the process controller knowing the particular hardware slot/output port to which the field device is connected before the connection actually takes place. Various examples of this hardware configurable I/O device are described in detail in U.S. Pat. Nos. 7,684,875; 8,332,567; 8,762,618; 8,977,851; 9,083,548; and 9,495,313, each of which is expressly incorporated by reference herein.

It is also well known to use a general purpose IP or other packet based communication protocol to perform communications between certain other devices within a process plant. For example, it is common to use a packet based or general purpose IP protocol on an Ethernet bus that communicatively connects one or more distributed process controllers to one or more user interfaces, databases (e.g., configuration databases and historian databases), servers, etc. within a back-end plant environment. As such, Ethernet, which is a physical layer and partly a data link layer, is an important communication platform for automation systems. Importantly, while process control communication protocols such as HART, 4-20 ma, FOUNDATION Fieldbus, CAN and PROFIBUS are currently used by the majority of the installed base to perform communications at the field device level, communication technology utilizing Ethernet is now emerging as a possibility for use in implementing field device communications. Importantly, Ethernet enables flexibility, scalability, and performance in a way not seen before in automation. To help support the adoption of Ethernet in automation, an Advanced Physical Layer (APL) specification is being designed to support the connection of field devices in remote and hazardous locations. Behind APL is the IEEE P802.3cg project which is focused on the development of enhancements to the existing IEEE 802.3 Ethernet standard (IEEE 802.3) for Ethernet via twisted-pair wiring (10BASE-T1L). This development is significant because there is a long list of automation protocols developed for various purposes that can run on top of an Ethernet physical layer.

In support of this emerging Ethernet based communication development in process control, the FieldComm Group has standardized HART-IP as part of the HART 7 release. Although HART-IP was initially designed to allow hosts to efficiently communicate with gateways, it has now emerged as a method for devices to communicate directly with I/O servers and hosts. HART-IP today is already being used in monitoring, control, diagnostics, and condition monitoring applications. Because HART-IP already has available to it a full descriptions of devices, it is a good protocol to layer on top of APL. Moreover, another protocol that is seeing wide-spread support at the device level is OPC Unified Architecture (OPC UA). Although OPC UA does not natively understand device communications and types, considerable effort is underway to provide some level of support in this regard. Although HART-IP and OPC UA are likely to be adopted relatively quickly by the marketplace, they will not be alone in their use. Other protocols, such as EthernetIP and PROFINET are already available on Ethernet and will be able to run on APL when it is available. In addition, IT-driven protocols such as MQTT and AMQP will emerge as important protocols as the Industrial Internet of Things (IIoT) gains acceptance.

However, supporting an Ethernet or other advanced physical layer, such as those associated with a packet based or general purpose IP communication protocol, in a process plant that already includes an installed base that relies heavily on more traditional field devices, for example, HART or FOUNDATION Fieldbus field devices, is difficult and not straight forward, as these various communication protocols will need to be synthesized or merged at some place in the process control network via one or more electronic marshalling cabinets or devices. It is presently unclear how such advanced protocols can be integrated within typical process plant architecture to operate reliably and in a robust manner.

SUMMARY

A new I/O device provides traditional I/O support with direct physical layers or interfaces associated with traditional or specialized process control communication protocols, such as 4-20 mA, 1-5 v, HART, FOUNDATION Fieldbus, etc. protocols, while at the same time supporting APL or other Ethernet or general purpose IP based physical layers and the communication protocols that run on top of them. In addition, the new I/O device is able to nest protocols inside of other protocols for use when protocols, such as safety protocols, require additional handshaking, confirmations, etc. Still further, the new I/O device includes hardware configurable capabilities that enable easy configuration of a process control system that uses multiple different physical layers, including those used by traditional process control communication protocols, and more advanced physical layers, including those used by general purpose IP communication systems to perform communications at the field device level (e.g., between the process controller and the field devices).

More particularly, the I/O device described herein supports multiple I/O types including packet based, IP based, or other advanced protocols, such as HART-IP, OPC UA, Ethernet, etc. protocols. The I/O device includes a mixed physical layer and multiple protocol support that can be used to implement control at an I/O device in a manner that leads to improved control. Additionally, the I/O device described herein is able to support request/response, publish/subscribe, event-based communications, and streaming communications, that will greatly help to support the combination of control and the Industrial Internet of Things (IIoT) applications (also generally referred to herein as monitoring systems) that are interested in measurement and actuator data, their capabilities, their diagnostics and information that can be determined by combinations of these measurements, capabilities and diagnostics.

DETAILED DESCRIPTION

Figure 1:
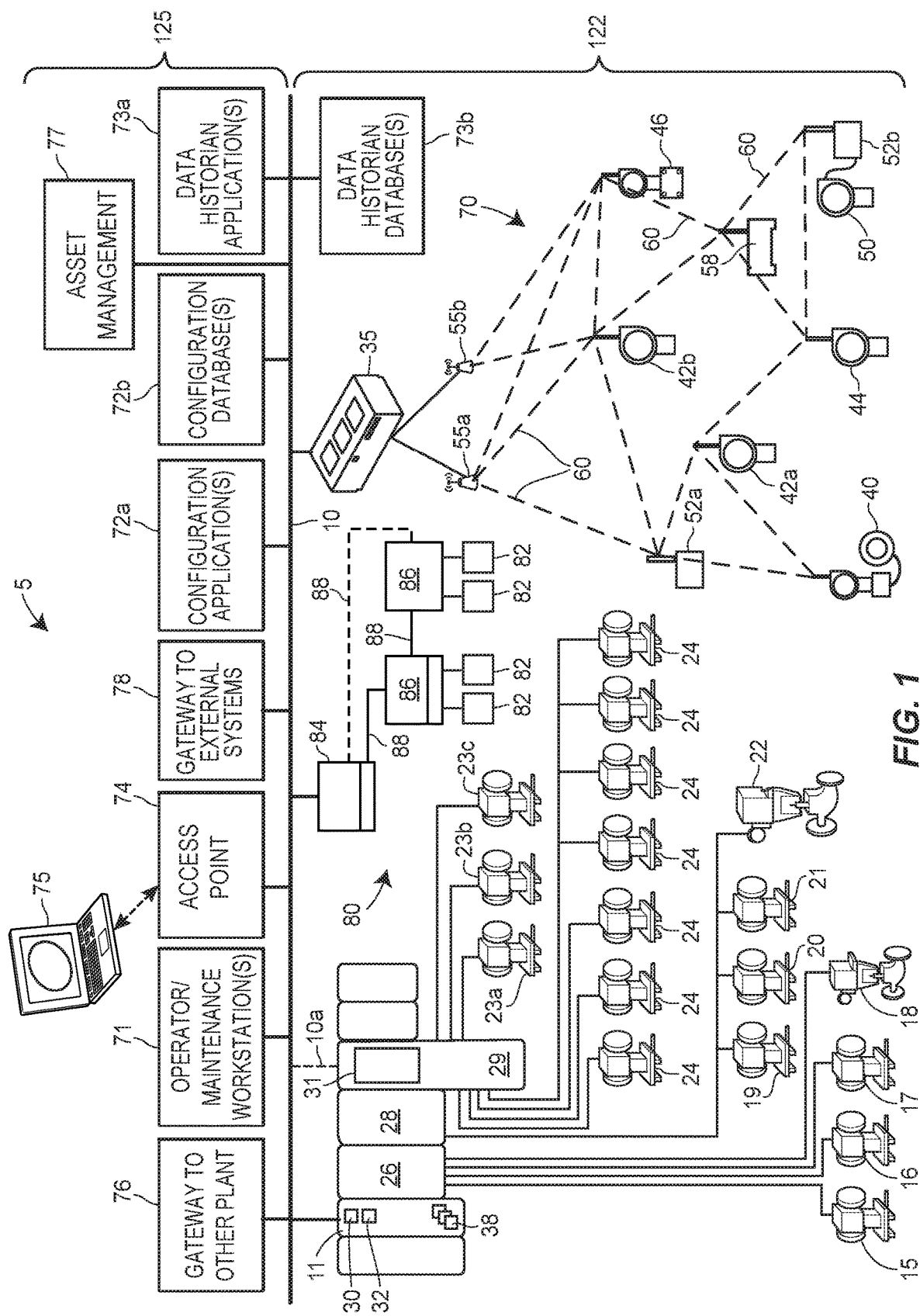
FIG. 1 is a diagram illustrating an example process plant, at least a portion of which implements a mixed physical layer and communications protocol I/O architecture.

FIG. 1 depicts a schematic diagram of an example process plant, process control system, or process control environment 5, that may use a hardware configurable marshaling or I/O device that supports multiple different physical layers and different communication protocols that use those different physical layers in providing communications with field devices in a plant. Generally speaking, the example process plant 5 of FIG. 1 includes one or more process controllers that receive signals indicative of process measurements made by field devices, that process this information to implement a control routine, and that generate control signals that are sent over wired or wireless process control communication links (physical layers) to other field devices to control the operation of a process in the plant 5. Typically, each of the field devices performs a physical function (e.g., opening or closing a valve, increasing or decreasing a temperature, taking a measurement, sensing a condition, etc.) to control the operation of a process. Generally, field devices communicate with process controllers using I/O devices, and the process controllers, field devices, and I/O devices may be wired or wireless. Moreover, any number and combination of wired and wireless process controllers, field devices and I/O devices may be included in the process plant environment 5.

As an example only, FIG. 1 illustrates a process controller 11 that is communicatively connected to wired field devices 15-22 via standard or traditional process control protocol input/output (I/O) cards 26 and 28, and to wired field devices 23 and 24 via an advanced or multi-protocol I/O card 29 which will be referred to herein as a mixed or multiple protocol I/O card or device or a mixed or multiple physical layer I/O device. In this case, the controller 11 is communicatively coupled to the I/O devices 26, 28 and 29 via a backplane bus (not shown) which may implement any desired communication protocol, including any proprietary protocol. The controller 11 is also communicatively connected to wireless field devices 40-46 in a wireless network 70 via a wireless gateway 35 and a process control data highway or backbone 10. The process control data highway 10, which may be implemented as an Ethernet communication structure, may include one or more wired and/or wireless communication links, and may be implemented using any desired or suitable general purpose IP communication protocol such as, for example, an Ethernet protocol. In some configurations (not shown), the controller 11 may be communicatively connected to the wireless gateway 35 using one or more communication networks other than the backbone 10, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc. Still further, the controller 11 may be coupled to field devices 82 via a further field device network 80 that uses an advanced physical layer (APL) or other physical layer that supports more traditional internet or packet based communication protocols.

The controller 11, which may be, by way of example, the DeltaV™ controller sold by Emerson Automation Solutions, may operate to implement a batch process or a continuous process using at least some of the field devices 15-24, 40-46 and 82. In addition to being communicatively connected to the process control data highway 10, the controller 11 is communicatively connected to at least some of the field devices 15-24, 40-46 and 82 via the I/O cards 26, 28 and 29 using any desired hardware and software associated with various different communication protocols, for example, a 4-20 mA, the FOUNDATION® Fieldbus protocol, the HART® protocol, the WirelessHART® protocol, etc. In FIG. 1, the controller 11, the field devices 15-24 and 82, and the I/O cards 26, 28 and 29 are wired devices, while the field devices 40-46 are wireless field devices. As will be understood, the wired field devices 15-24 and 82, and the wireless field devices 40-46 can conform to any standard or available communication protocols, such as any wired or wireless protocol, including any standards or protocols developed in the future.

Generally speaking, the process controller 11 of FIG. 1 includes a processor 30 that implements or oversees one or more process control routines 38 (e.g., that are stored in a memory 32). The processor 30 is configured to communicate with the field devices 15-24, 82 and 40-46 and with other nodes communicatively connected to the controller 11. The control routines 38 may be implemented in any desired software format, such as using object oriented programming, ladder logic, sequential function charts, function block diagrams, or using any other software programming language or design paradigm. The control routines 38 may be stored in any desired type of memory 32, such as random access memory (RAM), or read only memory (ROM). Likewise, the control routines 38 may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

In one example, the controller 11 implements a control strategy using what are commonly referred to as function blocks, where each function block is an object or other part (e.g., a subroutine) of an overall control routine and operates in conjunction with other function blocks (via communications called links) to implement process control loops within the process control system 5. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 5. Of course, hybrid and other types of function blocks exist. Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 11 may thus include one or more control routines 38 that may implement one or more control loops, which are performed by executing one or more of the function blocks.

The wired field devices 15-24, 82 may be any types of devices, such as sensors, valves, transmitters, positioners, etc., while the I/O cards 26 and 28 may be any known types of I/O devices conforming to any desired communication or controller protocol. In FIG. 1, the field devices 15-18 are illustrated as standard 4-20 mA devices or HART® devices that communicate over analog lines or combined analog and digital lines (the HART or 4-20 physical layer) to the I/O card 26, while the field devices 19-22 are smart devices, such as FOUNDATION® Fieldbus field devices, that communicate over a digital bus to the I/O card 28 using a FOUNDATION® Fieldbus communications protocol and physical layer. In some embodiments, though, at least some of the wired field devices 15, 16 and 18-22 and/or at least some of the I/O cards 26, 28 may alternatively communicate with the controller 11 using other suitable control system protocols (e.g., Profibus, DeviceNet, Foundation Fieldbus, ControlNet, Modbus, HART, etc.)

Moreover, as illustrated in general in FIG. 1, the wired field devices 23 and 24 are communicatively coupled to the I/O device 29 via various different communication lines or buses. In particular, and as will be described in more detail herein, the I/O device 29 includes multiple output ports, pin connectors or terminal blocks, which may each be adapted to accept physical layer hardware (communication lines) associated with different physical layers that support different field device communication protocols (e.g., two-wire, three-wire, four-wire, etc. physical layers). Still further, the I/O device 29 supports communications with different devices connected to the terminal blocks thereof using different communication protocols. In one example, the I/O device 29 may support and be connected to HART compliant physical layers (which may be used to communicate with the HART compliant field devices 23 using the HART communication protocol) and may also support and be connected to one or more other field devices 24 via one or more advanced physical layers, such as an Ethernet bus or wire set, the APL physical layer, etc., and may use a packet based protocol (e.g., an IP protocol, an Ethernet protocol, etc.), for example, to communicate with the field devices 24 over the advanced physical layer hardware. Of course, the field devices 23 and 24 may also be any types of devices, including sensors, valves, transmitters, positioners, etc., and may communicate with the I/O device or I/O card 29 using analog and/or digital signals and using wired or wireless physical layers.

While the I/O device 29 is communicatively connected to the controller 11 via a backplane bus (not shown in FIG. 1), as indicated by the dotted line 10a in FIG. 1, and thus enables the controller 11 to communicate with the field devices connected to the I/O device 29, the I/O device 29 may instead or also be directly connected to the bus or Ethernet connection 10 and communicate directly with applications and other devices (and even devices outside or external to the plant 5) on the bus 10 to provide direct access to the field devices 23, 24 connected to the I/O card 29. As will be described in more detail herein, because some of the field devices 23, 24 connected to the I/O card 29 may include IP addresses and therefore may be addressable via an IP protocol (that is, these field devices may be part of an IIoT system or other monitoring system or otherwise may be reachable via an IP communication protocol), the I/O card 29 can also act as a direct gateway within an asset management system or an IIoT system to the field devices 23, 24, so that these systems do not need to communicate through a controller (such as the controller 11) to obtain information from field devices that support an IP communication protocol.

In the example plant 5 depicted in FIG. 1, the wireless field devices 40-46 communicate via the wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the same wireless protocol or another wireless protocol, for example). To communicate with one or more other nodes that are not configured to communicate wirelessly, the wireless field devices 40-46 may utilize the wireless gateway 35 connected to the process control data highway 10 or to another process control communications network. The wireless gateway 35 provides access to various wireless devices 40-58 of the wireless communication network 70. In particular, the wireless gateway 35 provides communicative coupling between the wireless devices 40-58, the wired devices 11-29, and/or other nodes or devices of the process control plant 5. For example, the wireless gateway 35 may provide communicative coupling by using the process control data highway 10 and/or by using one or more other communications networks of the process plant 5.

Similar to the wired field devices 15-24, the wireless field devices 40-46 of the wireless network 70 perform physical control functions within the process plant 5, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1, a field device 48 of FIG. 1 is a legacy 4-20 mA device and a field device 50 is a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART, and may also support one or more other communication protocols such as Foundation® Fieldbus, PROFIBUS, DeviceNet, etc. Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1, the wireless devices 40-46 and 52-58 communicate with each other and with the wireless gateway 35 over wireless links 60 of the wireless communications network 70, and/or via the process control data highway 10.

Still further, and as will be described in more detail below, the process plant 5 includes an advanced physical layer network 80 that connects the field devices 82 directly to the network bus or backbone 10 using a packet based or IP communication protocol. In particular, the network 80 includes an APL power switch 84 coupled to multiple APL field switches 86 via an APL communication bus or line 88. Generally speaking, the APL power switch 84 includes a power supply that provides power to the APL field switches 86 via the line or bus 88 (which may be set up in a trunk configuration illustrated by the solid line or in a ring configuration illustrated by the solid and dotted lines in the network 80). The field devices 82 communicate with the APL field switches 86 using any desired protocol supported by the APL physical layer (which may be, for example, an Ethernet physical layer or any other physical layer that supports packet based communications, including non-time sensitive or time sensitive networks). Moreover, the field switches 86 communicate using the same protocol and physical layer over the lines 88 to the switch 84, which operates as a gateway to the backbone 10. Additionally, the field switches 86 are connected directly to one or more field devices 82 via spur lines (as defined by the APL physical layer) and communicates with the field devices 82 using the same communication protocol used on the trunk lines 88. The power switch 84 and the field switches 86 operate to communicate packets over the lines 88 between the backbone 10 and the field devices 82. Of course, if desired, the power switch 84 may be coupled directly to a process controller or may be coupled indirectly to a process controller, such as the process controller 11, via the backbone network 10.

Moreover, as illustrated in FIG. 1, the process control system 5 includes one or more operator and/or maintenance workstations 71 that are communicatively connected to the data highway 10. Using the operator or maintenance workstations 71, operators or maintenance personnel may view and monitor run-time operations of the process plant 5, device condition and status information, etc. and may take any diagnostic, corrective, maintenance, and/or other actions that may be required. At least some of the operator or maintenance workstations 71 may be located at various, protected areas in or near the plant 5, and in some situations, at least some of the operator or maintenance workstations 71 may be remotely located, but nonetheless be in communicative connection with the plant 5. Operator and maintenance workstations 71 may be wired or wireless computing devices.

The example process control system 5 is further illustrated as including a configuration application 72a and a configuration database 72b, each of which is also communicatively connected to the data highway 10. Various instances of the configuration application 72a may execute on one or more computing devices (not shown) to enable users to create or change process control modules and download these modules via the data highway 10 to the controllers 11, as well as to enable users to create or change operator interfaces via which an operator is able to view data and change data settings within process control routines. The configuration database 72b stores the created (e.g., configured) modules and/or operator interfaces. Generally, the configuration application 72a and configuration database 72b are centralized and have a unitary logical appearance to the process control system 5, although multiple instances of the configuration application 72a may execute simultaneously within the process control system 5, and the configuration database 72b may be implemented across multiple physical data storage devices. Accordingly, the configuration application 72a, configuration database 72b, and user interfaces thereto (not shown) comprise a configuration or development system 72 for control and/or display modules. Typically, but not necessarily, the user interfaces for the configuration system 72 are different than the operator workstations 71, as the user interfaces for the configuration system 72 are utilized by configuration and development engineers irrespective of whether or not the plant 5 is operating in real-time, whereas the operator and maintenance workstations 71 are utilized by operators and maintenance personnel during real-time operations of the process plant 5 (also referred to interchangeably here as "run-time" operations of the process plant 5). Moreover, the process control system 5 may include an asset management system 77 that may collect and process field device and controller data to perform maintenance on the process control system 5 in known manners. The asset management system 77 may include one or more databases for storing and processing collected data and/or may use the databases 72b and 73b and other databases within the plant. The asset management system 77 may also communicate directly with devices, such as the controllers 11, the input output devices 29, the gateway 35, the power switch 84, etc.

The example process control system 5 also includes a data historian application 73a and a data historian database 73b, each of which is also communicatively connected to the data highway 10. The data historian application 73a operates to collect some or all of the data provided across the data highway 10, and to historize or store the data in the historian database 73b for long term storage. Similar to the configuration application 72a and configuration database 72b, the data historian application 73a and historian database 73b are centralized and have a unitary logical appearance to the process control system 5, although multiple instances of a data historian application 73a may execute simultaneously within the process control system 5, and the data historian 73b may be implemented across multiple physical data storage devices.

In some configurations, the process control system 5 includes one or more other wireless access points 74 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 74 allow handheld or other portable computing devices (e.g., user interface devices 75) to communicate over a respective wireless process control communication network that is different from the wireless network 70 and that supports a different wireless protocol than the wireless network 70. For example, a wireless or portable user interface device 75 may be a mobile workstation or diagnostic test equipment that is utilized by an operator within the process plant 5 (e.g., an instance of one of the operator workstations 71).

In some configurations, the process control system 5 includes one or more gateways 76, 78 to systems that are external to the immediate process control system 5. Typically, such systems are consumers or suppliers of information generated or operated on by the process control system 5. For example, the process control plant 5 may include a gateway node 76 to communicatively connect the immediate process plant 5 with another process plant. Additionally or alternatively, the process control plant 5 may include a gateway node 78 to communicatively connect the immediate process plant 5 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

It is noted that although FIG. 1 only illustrates a single controller 11 with a finite number of I/O devices 26, 28, 29, field devices 15-24, 40-46 and 82, wireless gateways 35, wireless adaptors 52, access points 55, routers 58, and wireless process control communications networks 70 included in the example process plant 5, this is only an illustrative and non-limiting embodiment. Any number of controllers 11 may be included in the process control plant or system 5, and any of the controllers 11 may communicate with any number of wired or wireless devices and networks 15-24, 40-46, 35, 52, 55, 58, 70 and 82 via any number of I/O devices 26, 28, 29 to control a process in the plant 5. For example, the process plant 5 may include various physical areas, each having an associated one or more controllers 11 (and associated I/O devices 26, 28, or 29) in communication with an associated set of field devices and networks 15-24, 40-46, 35, 52, 55, 58 and 70 in that physical area.

Further, it is noted that the process plant or control system 5 of FIG. 1 includes a field environment 122 (e.g., "the process plant floor 122") and a back-end environment 125 which are communicatively connected by the data highway 10. As shown in FIG. 1, the field environment 122 includes physical components (e.g., process control devices, networks, network elements, etc.) that are disposed, installed, and interconnected therein to operate to control the process during run-time. For example, the controller 11, the I/O cards 26, 28 and 29, the field devices 15-24, and other devices and network components 40-46, 35, 52, 55, 58 and 70 are located, disposed, or otherwise included in the field environment 122 of the process plant 5. Generally speaking, raw materials are received and processed in the field environment 122 of the process plant 5 using the physical components disposed therein to generate one or more products.

The back-end environment 125 of the process plant 5 includes various components such as computing devices, operator workstations, databases or databanks, etc. that are shielded and/or protected from the harsh conditions and materials of the field environment 122. Referring to FIG. 1, the back-end environment 125 includes, for example, the operator or maintenance workstations 71, the configuration or development systems 72 for control modules and other executable modules, data historian systems 73, and/or other centralized administrative systems, computing devices, and/or functionality that support the run-time operations of the process plant 5. In some configurations, various computing devices, databases, and other components and equipment included in the back-end environment 125 of the process plant 5 may be physically located at different physical locations, some of which may be local to the process plant 5, and some of which may be remote.

Figure 2:
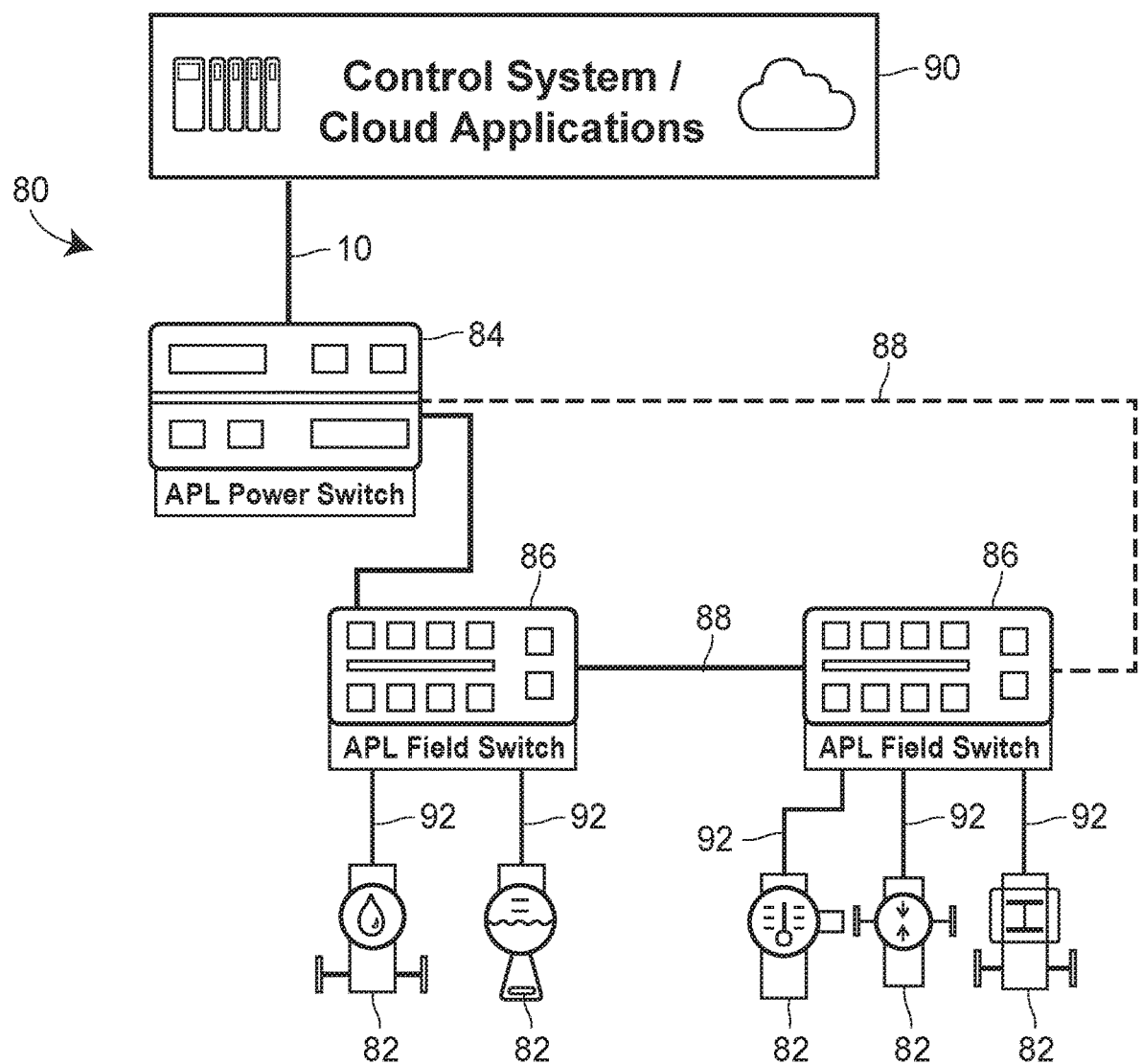
FIG. 2 depicts a diagram of an example advanced physical layer network connected to an Ethernet bus of the plant of FIG. 1 and that is used to support direct IP based communications with field devices.

As noted above, the plant environment 5 and, in particular, the field environment 122 of the plant 5 includes support for advanced protocols running on advanced physical layers to perform communications between field devices and the process controllers. As one example of this support, FIG. 2 depicts the advanced physical layer (APL) network 80 of FIG. 1 in more detail. The APL network 80 supports communications between various field devices 82 and the controller 11 using a packet based or an advanced (e.g., general purpose IP based) communication protocol. In particular, the network 80 includes an APL power switch 84 connected via, for example, an Ethernet or other bus 10, to the control system (e.g., a controller 11 of FIG. 1) and/or to a cloud or other applications 90. The cloud applications 90 may be or may include any or all of the applications and devices 71, 72, 73, 74, 75, 76 of FIG. 1, as well as other devices connected thereto via access points, such as the access point 74. The cloud applications may include simulation applications, control applications, data storage and processing applications, etc. In any event, the APL power switch 84 includes an APL power device that provides power over the APL physical layer, and the APL power switch 84 acts as a gateway to the APL network 80 and, in particular, to various APL field switches 86, which are connected to the APL power switch 84 via a bus or wire network 88 conforming to the APL physical layer standards. As illustrated with respect to FIG. 1, the bus or network 88 may be a trunk line or may be a ring-type connection, as indicated by the dotted portion of the bus 88. In any event, the bus 88 is an APL physical layer including, for example, a two-wire or a four-wire wired network, that provides communication signals as well as power signals from the APL power switch 84 to the APL field switches 86. Moreover, each of the APL field switches 86 has one or any other number of field devices 82 connected thereto via an appropriate APL physical layer or link 92. As an example, the APL links 92 may conform to the APL specification and may be two-wire or four-wire buses, which provides or enables communication signals and power signal to be sent between the APL field switches 86 and the field devices 82.

Of course, the APL power switch 84 acts as a gateway to the bus 10 and operates to multiplex signals from outside sources, such as signals from the backbone bus 10, onto the link 88 using a communication protocol set up for the network 80. Likewise, the power switch 84 may operate to decode messages from any of the field switches 86 (which may be messages from the field devices 82) that are on the link 88 and that are addressed to destinations outside of the network 80 and to send these messages onto the link 10. Likewise, the APL field switches 86 decode messages on the link 88 and, if addressed to one of the field devices 82 connected to the field switch 86, the field switch 86 places the message on the spur line or link 92 to be sent to the field device 82. Likewise, the field switches 86 receive messages from the field devices 82 via the links 92 and place those messages on the link 88 for delivery to another field switch 86 or the power switch 84. Generally speaking, the field devices 82 are all APL compliant field devices in that they use the APL physical layer and a communication protocol that is supported by the APL physical layer (e.g., an IP communication protocol) for communications via the links 92 and 88. The field devices 82 may also receive power via the links 92, and this power is provided from the field switches 86 and is ultimately provided over the bus 88 from the APL power switch 84 and a power supply associated therewith.

In one example, the APL (physical layer) of FIG. 2 may be a ruggedized, two-wire, loop-powered Ethernet physical layer that uses 10BASE-T1L plus extensions for installation within operating conditions and hazardous areas of process plants. In this case, the APL power switch 84 provides connectivity between all standard Ethernet networks and field devices and includes power supplies to provide power to the APL field switches 86 and the field devices 82. Typically, the power switch 84 will be located in the control room or in a junction box on a skid. Likewise, the APL field switches 86 may be designed for installation and operation in hazardous areas. The field switches 86 are loop-powered by the APL power switch 84 and distribute both communication signals and power via spurs 92 to the field devices 82. The Advanced Physical Layer (APL) project was initiated to create a protocol-neutral Ethernet that can solve the problem of finding a long-reach Ethernet protocol. This physical layer can be used as described herein in process automation and on process instrumentation to connect field devices in, for example, remote and hazardous locations and operates to extend the Ethernet physical layer operating at 10 Mb/sec over single-pair cable. Moreover, APL extends 10BASE-T1L for use in hazardous areas which enables the development of standards associated with typical protection methods, especially intrinsic safety.

As such, the network 80 of FIG. 2 can use any communication protocol supported by the APL, such as any protocol supported by an Ethernet connection. These protocols include, but are not limited to, internet protocols (IP protocols), packet-based protocols, time sensitive and non-time sensitive protocols, etc. More particularly, these protocols may include the HART-IP, the OPC UA and any other desired protocols designed for process control communications. Likewise, these protocols may include protocols not traditionally used in process automation, such as general purpose IP protocols, including protocols that support request/response, publish/subscribe, and event-based communications, and data streaming.

The use of the network 80 illustrates one methodology of implementing an APL physical layer and a supported communications protocol within a process control system to provide communications between field devices, such as the field devices 82, and other devices such as process controllers 11 or other devices on the network 10 of FIG. 1. Of course, in other cases, a process controller, such as the process controller 11 of FIG. 1, can be connected directly to the APL power switch 84 in order to provide communications with that power switch using the APL physical layer and to thereby perform communications between the field devices 82 and the controller (e.g., the controller 11) using an APL physical layer. Moreover, while a power supply may be provided in or associated with the APL power switch 84 and may send power to the field switches 86 via the bus 88, the APL field switches 86 may be separately powered or may include their own power supplies or sources and power themselves, as well as the field devices 82, via the APL spur lines 92.

Generally speaking, the network 80 provides an example of a manner of providing a stand-alone APL network within a process control system to provide communications, using a more traditional IP based communication protocol, between a process controller and field devices. The network 80 may be beneficial when new field devices, that support a more traditional IP based communication protocol, are newly added to a plant or to an area of a plant. However, it is also possible to integrate an APL physical layer (and an IP communications protocol using that layer) within an existing plant network. More particularly, an overall I/O system may be used within a field environment of a plant to support multiple I/O types while keeping the more traditional I/O architecture of the plant. In general, a new I/O device provides or supports a mixed physical layer which can support multiple different communication protocols, including traditional process control protocols and more common or general purpose IP based protocols. Still further, this I/O device provides control at an I/O device processor that leads to improved control, and that supports the combination of control and IIoT applications (which are typically interested in measurement and actuator data), their capabilities, and their diagnostics.

Figure 3:
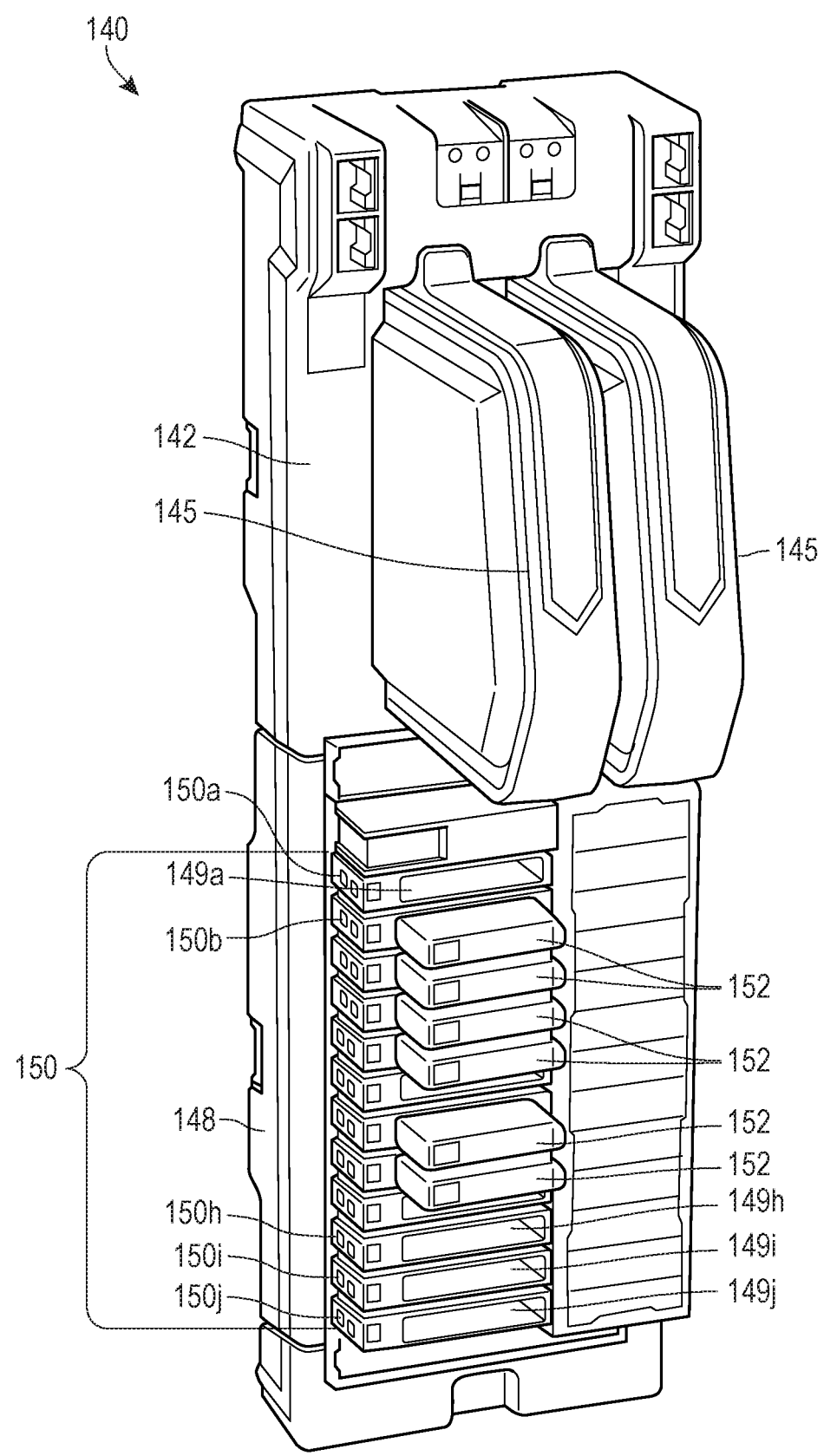
FIG. 3 depicts a hardware configurable I/O or marshalling device that supports communications with field devices using multiple different physical layers and communication protocols.
Figure 4:
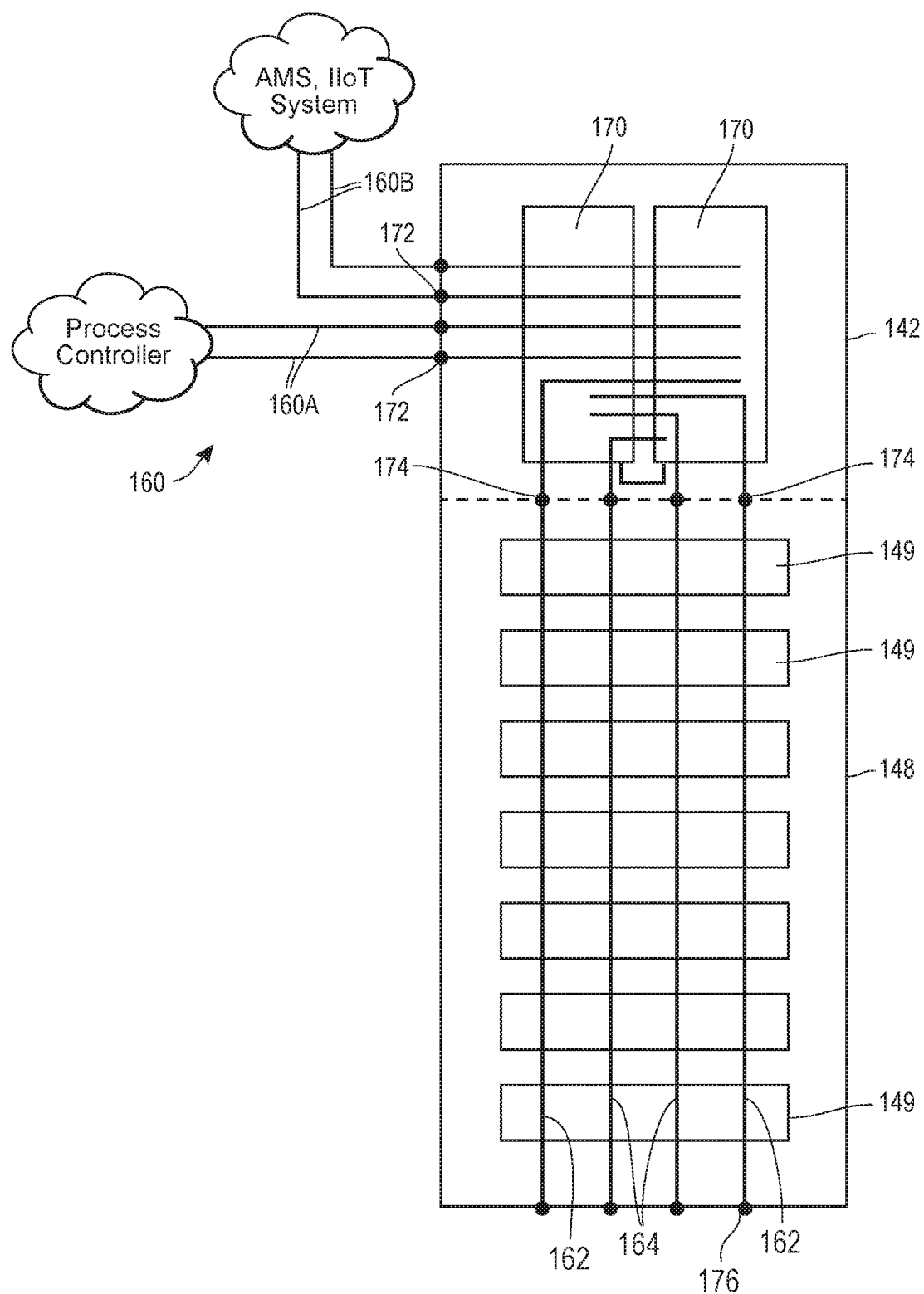
FIG. 4 depicts a partial electrical schematic of the hardware configurable marshalling device of FIG. 3.

The I/O device 29 of FIG. 1 is an example I/O device that provides a mixed physical layer and communication protocol platform, and that can be used to provide communications between a process controller and multiple different field devices via various different physical layers and various different communication protocols. FIGS. 3 and 4 illustrate a mixed physical layer and protocol device 140 (which may be the I/O device 29 of FIG. 1) in more detail. More particularly, FIG. 3 depicts a perspective view of an example electronic marshaling or I/O device 140 that supports communications with the multiple different field devices using multiple different physical layers and, if desired, using different communication protocols on the different physical layers. Generally speaking, the I/O device 140 includes an I/O card base or carrier having an upper portion 142 (associated with a head-end unit or controller side of the I/O card 140) and a lower portion 148 associated with a field device side of the I/O card 140. The upper portion 142 of the base includes preconfigured slots (not explicitly shown in FIG. 3) into which one or more I/O processor modules 145 are placed or are inserted. The I/O card carrier base 142 may support multiple different I/O processor modules 145 to which a process controller (e.g., the process control 11 of FIG. 1) may be connected via a wired or wireless connection discussed with respect to FIGS. 1 and 4 but not shown explicitly in FIG. 3. In the example of FIG. 3, the I/O base 142 supports two I/O processor modules 145, however, more or fewer processor modules 145 could be supported in (inserted into) the base 142. Moreover, the I/O processor modules 145 may be associated with the same or with different communication protocols, may be redundant I/O processor modules that perform the same functionality for one or more different communication protocols, may include a separate I/O processor module for each different communication protocol supported by the I/O device 140, or may include a processor module 145 that support multiple different communication protocols using different physical layer structure. Still further, one of the processor modules 145 may be or may include one or more power supplies for one or more different communication protocols, etc.

As will be understood, the processor modules 145 perform communications with a process controller that is communicatively connected on one side of the I/O device 140 (e.g., the process controller 11 of FIG. 1) and performs communications with various different electronic marshalling components disposed on the I/O device 140, which marshalling components communicate with field devices on the other side of the I/O device 140. The processor modules 145 may include specialized or general purpose processors and memories, that are programmed to perform various communication functions including receiving and sending communication signals to the process controller, decoding and coding signals received from and sent to field devices using one or more communication protocols, responding to messages from field devices and the process controller using the appropriate communication protocol to communicate information and messages from the controller to the field devices and vice-versa, tracking the identity of and the logical location of field devices coupled to the I/O device (i.e., determining, tracking and storing communication paths and communication protocols that are used to communicate with the field devices connected to the I/O device), etc. The processor modules may also, in some cases, include a power supply or connect to an external power supply and supply power over one or more field device communication networks connected to the I/O device 140.

Additionally, the lower marshaling base 148 electrically and communicatively connects to the upper base 142 (and therefore, to the I/O modules 145) via one or more internal busses (not shown in FIG. 3). While only one lower base 148 is illustrated in FIG. 3, multiple lower bases 148 could be serially connected together to connect to the upper base 142. Each of bases 148 (again, only one of which is illustrated in FIG. 3) supports a plurality of individually configurable channels, wherein each channel includes a dedicated slot 149A, 149B, etc., coupled to a dedicated wire terminal block 150A, 150B, etc. disposed on the base 148. Each wire terminal block 150 includes wire termination points, connectors or other attachment hardware of any desired type to connect the terminal block 150 to one or more field devices, and each terminal block 150 may be configured to receive or to connect to wires or physical layer hardware associated with any of various different physical layers called for by different communication protocols. In some cases, each terminal block 150 may be configured to accept wiring or physical layer structure associated with multiple different types of physical layers. As a result, each termination block 150 may include screw wire connectors, spring loaded wire connectors, etc. for each of two, three, four, etc. wires that may be used for or that are compliant with various different types of physical layers (which in turn, support any of various different communication protocols). As an example only, each terminal block 150 may include a set of wire connectors that may accept and connect wires associated with one or more of a HART physical layer, a FOUNDATION Fieldbus physical layer, an Ethernet physical layer, an APL physical layer, or any other desired physical layer.

Likewise, each of the slots 149 is adapted or configured to accept a removable electronic marshaling component (EMC) 152. A different ECM 152 may be removably inserted into each different slot 149A, 149B, etc. and, when inserted into a slot 149, may be securely received and electronically connected to the terminal block 150 associated with the particular slot 149. While not explicitly shown in FIG. 3, each slot 149 is also connected via one or more internal buses (within the bases 148 and 142) to the I/O processor modules 145 to enable the I/O processor modules 145 to communicate with each of the ECMs 152 inserted into any of the slots 149. Each EMC 152 also includes a processor and a memory, wherein the processor may be a general purpose processor or a specific processor (e.g., implemented as an ASIC or some other specialized hardware or firmware processor), and is programmed to perform communication functions with one or more field devices connected to a terminal block 150 of the base 148 using a particular communication protocol and physical layer. The processor of each EMC 152 may detect one or more field devices connected to the associated terminal block, poll the field device(s) for specific device information using a particular communication protocol, including for example, device identity and configuration information, may store this information in a local memory on the EMC 152 and may communicate this information, as well as device communication path information to the processor module 145 in the head-end unit. Still further, the processor of each EMC 152 may be programmed to configure and send messages from the processor module 145 to one or more field devices connected to the associated terminal block 150 using a particular communication protocol and to receive and decode (if necessary) messages from the one or more field devices connected to the associated terminal block 150 and to pass these messages to the processor module 145 (via one of the internal busses in the base units 148 and 142) for processing and communication to the process controller, if needed.

FIG. 4 illustrates a partial mechanical and partial electrical schematic diagram of the I/O device 140 of FIG. 3 to illustrate the busses that are disposed within the bases 142 and 148 of the I/O device 140. In particular, a set of slots 170 on the upper base 142 accepts I/O processor modules 145. A first bus 160 is connected to each of the slots 170. A first portion of this bus 160 is disposed within the upper base 142 and terminates on at the edge of the upper base 142 at termination points or connectors 172. A second portion of the bus 160 is exterior to the base 142 and connects to the termination points or connectors 172 and extends to a further device, such as to one of the process controllers 11 of FIG. 1. The bus 160 could instead or additionally, however, connect the device 140 directly to an IIoT system (or other monitoring system), an asset management system or any other external system to provide direct access (e.g., direct access via an IP addressing system or scheme) to one or more of the field devices connected to the terminal blocks of the card 140. If desired, the device 140 could include two different busses 160A and 160B as part of the bus 160, with one of these busses 160A being connected to a controller (that uses a first communication protocol, such as a proprietary or no-IP communication protocol) and another of these busses 160B being connected to a physical layer that supports or uses an IP protocol (as shown by the connection 10a in FIG. 1). In any event, the bus 160 (and/or the sub-busses 160A and 160B making up the bus 160) couples the slots 170 (and in particular, the I/O processor modules 145 when disposed in the slots 170) to a process controller, such as to the process controller 11 of FIG. 1, and or to an asset management system (e.g., the asset management system 77 of FIG. 1), to an IIoT system or other monitoring system, or to any other external system. Still further, second and third buses 162 and 164 are disposed within and span across the bases 142 and 148 via termination points or connectors 174. The busses 162 and 164 (which may be sub-busses of the same bus or which may be separate busses) connect the slots 170 on the base 142 (and thus the I/O processor modules 145 disposed within the slots 170) to the slots 149 on the lower base 148 (and thus to the EMCs 152 disposed within the slots 149). The connectors 174 enable the bases 142 and 148 to be modular by providing for electrical connection of the busses 162 and 164 when the bases 142 and 148 are first attached together. Likewise, the busses 162 and 164 extend to a bottom or lower portion of the base 148 and terminate in a set of further termination points or connectors 176, which enable a further base unit 148 to be mechanically and electrically attached to the base 148 illustrated in FIG. 4. This modular feature increases the number of slots to which the busses 162 and 164 can be connected and enables multiple lower bases 148 to be connected in a serial manner to a single upper base 142, which extends the I/O capability of the I/O processor modules 145 inserted into the slots 170 of the upper base 142.

As will be understood, insertion of various different ones of the electronic marshalling components 152 (EMCs) into the slots 149 operates to connect the internal processor of the EMCs 152 to one of the busses 162 or 164 (or, in some cases, to both of the busses 162 and 164) on one side of the EMC 152 (e.g., an input side of the EMC 152) and to the appropriate set of wire terminals of the terminal block 150 associated with the slot 149 on another side of the EMC 152 (e.g., an output side of the EMC 152). As a result, an EMC 152, when inserted into a slot 149, will be electrically connected to an I/O processor module 145 on the input side of the EMC 152 via at least one of the busses 162 and 164, and will be communicatively coupled to a process controller (and/or another external system) via one of the I/O processor modules 145 and the bus 160. Still further the EMCs 152 will be connected to one or more field devices on the output side of the module 152 via the terminal block 150 for the slot 149 into which the EMC 152 is inserted and the physical layer (e.g., wires) connecting the terminal block 150 to the field device(s). As will be understood, different ones of the EMCs 152 may be configured to use different physical layers and different communication protocols to communicate with one or more field devices. Still further, different types of the EMCs 152 will have connection structure that connects differently to the busses 162 and 164. Thus, EMCs 152 that use one type of physical layer or communication protocol may connect to the bus 162 while EMCs 152 that use a second type of physical layer or a second and different communication protocol may connect to the bus 164.

Thus, different ones of the removable hardware modules or EMCs 152 can be inserted into any of the slots 149 to provide connectivity between each of the EMCs 152 and one or both of the I/O processor modules 145 via one or both of the buses 162 and 164, as well as to provide connectivity to one of the terminal blocks 150 to which wires from various different field devices may be connected. In this particular example, each of the terminal blocks 150 may accept wires associated with various different types of physical layers including, for example, 2-wire physical layers, 4-wire physical layers, physical layers that specify particular thicknesses, types, minimum and maximum lengths of wires, etc., physical layers that call for various types of switches or other physical structure, physical layers that support wireless communications, etc., to thereby connect different types of physical layers to the different EMCs 152 when the EMCs 152 are inserted into different ones of the slots 149. If desired, some of the terminal blocks 150 may support a first type of physical layer (e.g., a HART or 4-20 ma physical layer), while others of the terminal blocks 150 may support a second type of physical layer (e.g., a Fieldbus or Profibus physical layer), and still other terminal blocks 150 may support a third type of physical layer (e.g., an IP, Ethernet or APL physical layer). In other cases, one or more of the terminal blocks 150 may have connection structure that is configured to support two, three or more different types of physical layers.

Of course, the EMCs 152 include electrical connection structure that, when inserted into a slot 149, electrically connects to one and, if desired, both of the buses 162 and 164, depending upon the configuration of the module 152, as well as electrical connection structure that electrically connects an EMC 152 to the terminal block 150 associated with the slot 149 into which the EMC 152 is inserted. Likewise, each removable hardware EMC module 152 includes a processor of some type (e.g., a general purpose processor, a specifically configured processor such as an ASIC, etc.) and software or firmware that is implemented on the processor to perform communications using a particular communications protocol (and using a particular physical layer). Thus, for example, different ones of the EMCs 152 may be associated with, programmed to implement, or use different communication protocols (and physical layers used for those protocols). Thus, some of the EMCs 152 may be HART protocol modules, which may be conformed to the HART communication protocol, some of the EMCs 152 may conform to or use IP communication protocol which use an APL or an Ethernet physical layer, and some of the EMCs 152 may be FOUNDATION Fieldbus modules, which conform to or implement the FOUNDATION Fieldbus protocol. In the example schematic diagram of FIG. 4, the I/O device 140 supports at least two different communication protocols because this device 140 includes two different buses 162, 164 disposed between the head-end unit or I/O processor modules 145 and each of the individual slots 149. Each of these two different buses 162 and 164 may be associated with or conform to a different physical layer and may support different communication protocols, such as a HART communication protocol which uses a HART physical layer and an IP communication protocol which uses an APL physical layer, for example. The support of the two different protocols (and two different physical layers) enables differently configured EMCs 152 (which support different communications protocols and potentially different physical layers) to be inserted into different ones of the slots 149 and to be connected to communicate with different field devices that use these different protocols (and physical layers). While two buses 162 and 164 are illustrated in FIG. 4 to support two different communication protocols (and/or physical layers), the device 140 could include three or more buses to support three or more different communication protocols and physical layers.

Figure 5:
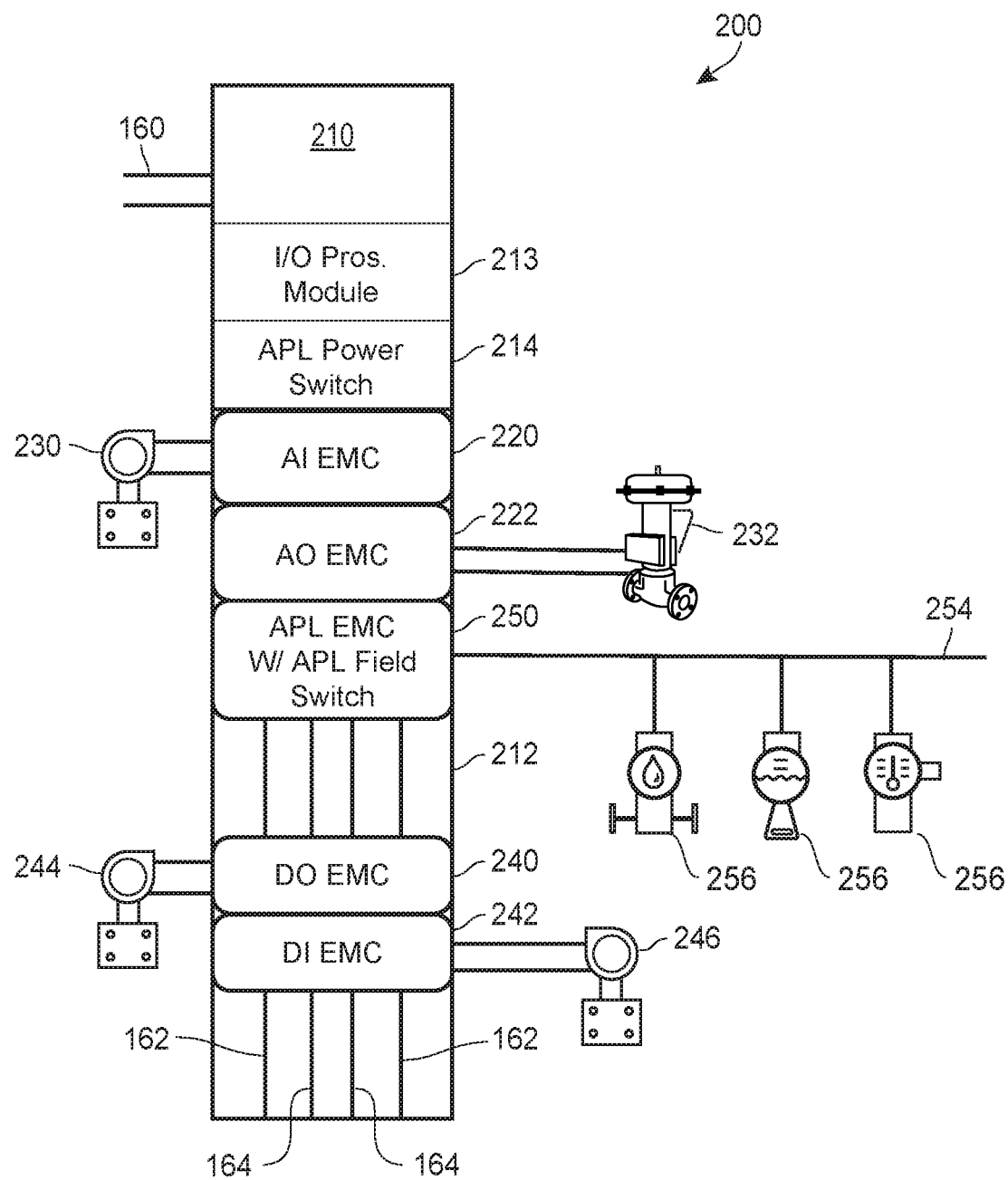
FIG. 5 depicts a schematic diagram of the marshalling device of FIG. 3 configured to support both HART and APL physical layers and devices connected thereto using separate power and field switches in the APL layer.

FIGS. 5-11 depict different (and non-limiting) manners in which various different communication protocols and physical layers can be combined in and supported by a single I/O device, such as the I/O device 140 of FIGS. 3 and 4, to thereby provide communications between a controller and various different field devices that use different communication protocols and physical layers. Referring to FIG. 5, an I/O device 200 configured similarly to the device 140 illustrated in FIGS. 3 and 4 (and that thus uses hardware-configurable EMC modules) is depicted in schematic form. In particular, the I/O device 200 includes a head-end unit 210 electrically connected to a base 213 on which various removable EMC modules can be inserted into slots (not explicitly shown in FIG. 5). In the example system of FIG. 5, the head-end unit 210 includes multiple I/O processing modules 213 and 214 with one of the processing modules 213 being configured to perform communications with field devices that use the HART or 4-20 ma physical layer and communication protocol(s) and the other of the I/O processing modules 214 being configured to use and support an APL physical layer to perform communications with field devices using an APL supported communication protocol (such as an IP protocol, an Ethernet protocol, etc.) However, these I/O processing modules 213 and 214 are exemplary in nature and could conform to and use other communication protocols and other types of physical layers for communications with field devices.

More particularly, as illustrated in FIG. 5, a removable EMC module 220 is inserted into one of the slots (not explicitly shown) of the base 212 and performs analog input (AI) signal processing via a 4-20 mA communication protocol and physical layer to support communications with a traditional 4-20 ma field device 230 connected to the terminal block of the base 212 associated with the inserted module 220. Likewise, a removable EMC module 222 performs analog output (AO) signal processing via a 4-20 mA protocol and physical layer to support communications with a field device 232. Each of these EMC modules 220 and 222 is connected to the bus 162 in the base 212, and the bus 162 connects these modules to the I/O processing module 212 in the head end unit 210, which performs processing or multiplexing of the AI and AO signals to and from the removable modules 220 and 222. As noted with the device 140 of FIG. 3, the head-end unit 210 include a removable I/O processing module 213 (which may be one of the modules 145 of FIG. 3) which communicates via an external bus 160 to a process controller, an asset management system, an IIoT system, etc. (not shown), and which operate to perform signal conditioning and multiplexing of signals between the modules 220 and 222 on one side and the process controller (or other external system) on the other side.

Still further, the I/O device 200 includes discrete or digital output (DO) and discrete or digital input (DI) EMC modules 240 and 242, which perform discrete output and input signal processing on signals sent to and from field devices 244 and 246, respectively, that use, for example, a HART communication protocol and physical layer. The EMC modules 240 and 242 may also be connected to the bus 162 to communicate with the I/O processing module 213 within the head-end unit 210, which processes and multiplexes signals sent over the bus 162. Thus, in this example, the AI, AO, DI and DO EMC modules 220, 222, 240 and 242 interconnect valves, transmitters and other field devices 230, 232, 244 and 246 with the head end unit 210 of the I/O device 200 using a 4-20 mA or a HART 2-wire physical layer. These communications may be performed in the same manner as discussed within any of U.S. Pat. Nos. 7,684,875; 8,332,567; 8,762,618; 8,977,851; 9,083,548; and 9,495,313.

However, as illustrated in FIG. 5, the I/O device 200 also accepts another type of removable EMC module that is associated with another type of physical layer (in this case an APL physical layer) and that supports other communication protocols (such an any IP based communication protocol) for communicating with field devices. In particular, a removable EMC module 250 is inserted into one of the slots of the base 212 and comprises an APL EMC module that implements the functionality of an APL field switch (such as one of the APL field switches 86 of FIGS. 1 and 2).

In this case, the removable EMC module 250 connects between the bus 164 and the terminal block associated with the slot into which the EMC module 250 is inserted. Moreover, as also illustrated in FIG. 5, the I/O processing module 214 of the head-end unit 210 includes an APL power switch mounted or disposed therein, and this power switch is configured to implement the functionality of the APL power switch 84 of FIGS. 1 and 2. As such, the APL power switch 214 may include a power supply, is connected to the bus 164, and operates to perform communications over the bus 164 and the field switch EMC module 250 in the manner that the APL power switch 84 of FIGS. 1 and 2 operates to send and receive signals on the bus 88 of FIGS. 1 and 2. As such, the bus 164, in this configuration, operates as a trunk bus on an APL network.

As also illustrated in FIG. 5, the APL field switch EMC module 250, which is insertable into a slot on the base 212 of the I/O device 200, connects to a terminal block associated therewith, which in turn is connected to an APL spur line 254 (which may be similar to one of the spur lines 92 of FIGS. 1 and 2). The spur line 254 is part of the APL physical layer, and the APL physical layer, comprising the power switch 214, the bus 164, the field switch module 250 and the bus 254, may implement or use any communication protocol that is supported by the APL physical layer, such as an Ethernet protocol, a HART-IP protocol, an OPC UA protocol, a traditional general purpose IP protocol, etc., to provide communications between various field devices 256 (connected to the bus 254) and the head end unit 210. It will be understood that the APL power switch 214 may be an extension of the head-end unit 210 (that is, integrated into the head end unit 210) or that the APL power switch module 214 may be insertable into the head end 210. In either case, the APL power switch module 214 incorporates the electronic circuitry of a typical APL power switch and may therefore include a power source that provides power and communication signals over the bus 164 to the APL field switch module 250, which in turn also provides power and communication signals over the spur bus 254 of the APL network to the field devices 256. In this regard, the bus 164 may be configured to meet the requirements or specifications of an APL physical layer trunk line. It will be understood that the field devices 256 may use the communications protocol layered on the APL physical layer provided by the modules 214 and 250 and the buses 164 and 254. Typically, such a communications protocol will be an IP or packet based protocol and, as will be understood, the field devices 256 do not need to support a traditional process control communications protocol, such as a HART, Profibus, FOUNDATION Fieldbus, etc., protocol. Instead, the field devices 256 can communicate directly using a more traditional IP interface or may use a more robust or packet based communications protocol developed for the process control industry, such as the HART-IP or the OPC UA communication protocols which are currently not supported in traditional process controller I/O networks. This network also supports communication protocols that support request/response, publish/subscribe, event-based communications, and streaming communications, which greatly helps to support the combination of control and the Industrial Internet of Things (IIoT) applications that are interested in measurement and actuator data, their capabilities, and their diagnostics.

Thus, the I/O device 200 establishes one or more communication networks that enable communications with field devices using at least two different types of physical layers and various different communications protocols overlaid on those physical layers. In particular, the modules 220, 222, 240 and 242, along with the bus 162 within the base unit 212, implement a first physical layer (associated with the HART or 4-20 ma physical layer, which are the same physical layer) and enable communications over that first physical layer using a traditional process control communications protocol in the form of 4-20 mA communication protocol and/or a HART communication protocol. The EMC modules 220, 222, 240 and 242 are programmed to perform these types of communications in known manners. Additionally, however, the APL power switch 214 and the APL field switch 250, along with the bus 164 and the bus 254 implement a second and different physical layer, in the form of an APL physical layer, and enable communications with various field devices 256 using any communication protocol supported by the APL physical layer. Such communication protocols may include an Ethernet protocol, an IP or packet based protocol, the HART-IP protocol, the OPC UA protocol, etc. Moreover, because the APL physical layer may support up to 50 devices on a single spur line, the APL field switch 250 of FIG. 5 may support 50 field devices when connected to the spur line 254, thereby greatly enhancing the communication capabilities of the I/O device over that normally associated with an I/O device that supports HART or 4-20 mA physical layer and associated communication protocols. Moreover, additional slots of the base unit 212 of the device 200 may accept additional APL field switch EMC modules (such as the APL module 250), and each of these additional APL field switch EMC modules may support additional field devices using an APL physical layer. This capability greatly enhances the ability of the I/O device 200 to support communications, providing I/O support for a greater number of field devices than ever before possible.

Figure 6:
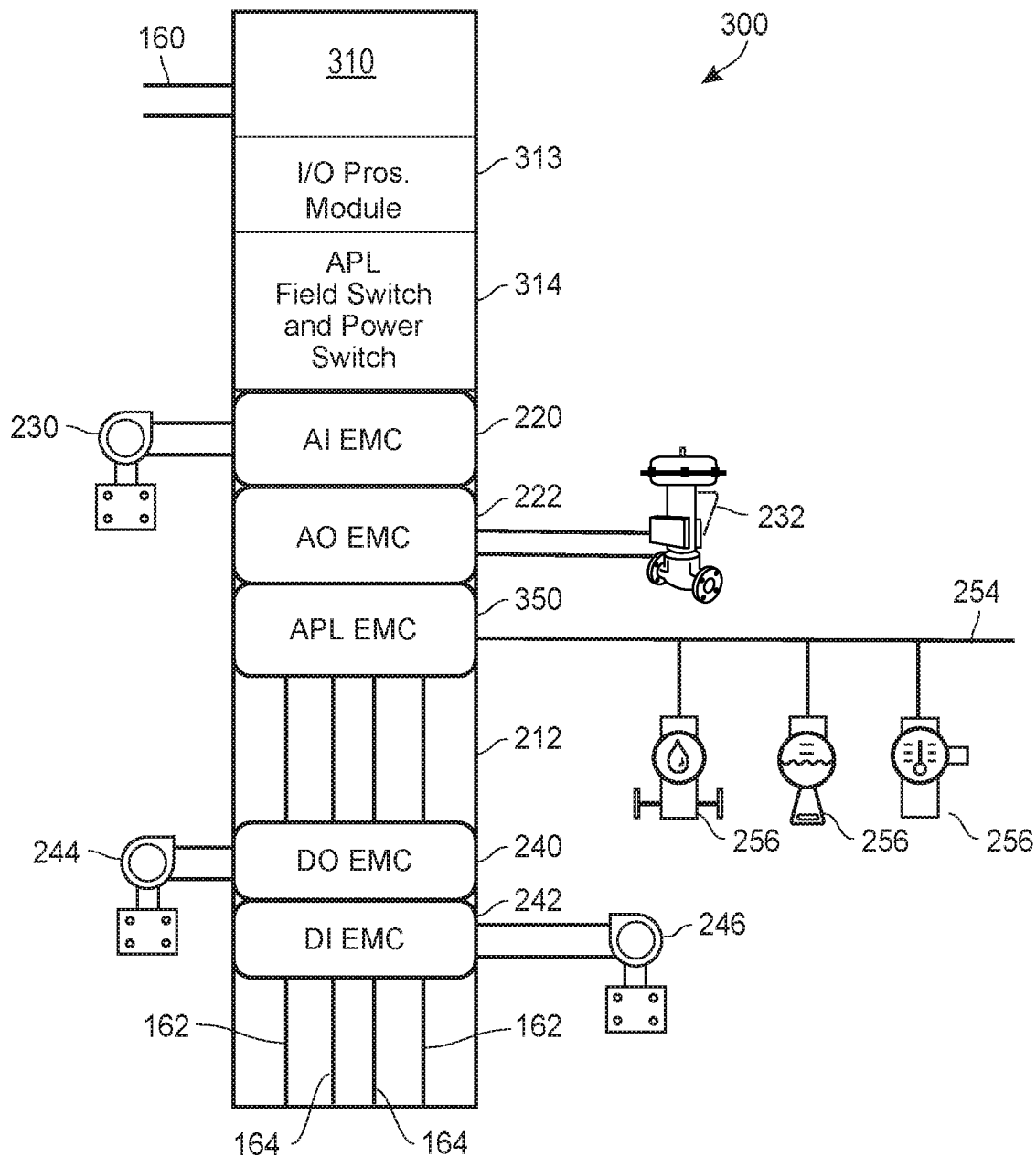
FIG. 6 depicts a schematic diagram of the marshalling device of FIG. 3 configured to support both HART and APL physical layers and devices connected thereto using a combined APL power and field switch in the APL layer.

FIG. 6 depicts another embodiment of an input/output device 300 (which may be the same or similar to the I/O device 140 of FIGS. 3 and 4) that supports multiple different physical layers and potentially different communication protocols on those physical layers. More particularly, the input/output device 300 of FIG. 6 is similar to the I/O device 200 of FIG. 5 in that it includes a bus 162 and an I/O processing module 313 that support AI and AO EMC modules 220 and 222 and DI and DO EMC modules 240 which are connected to and communicate with HART and 4-20 ma field devices attached thereto using a first type of physical layer. However, in this example, the I/O processing module 214 is an APL field switch and power switch combined into a single unit at the head-end unit 310 of the I/O device 300. The APL field and power switch 314 communicates over the bus 164, which may be or may support an APL physical layer for example, and as such may be similar to a spur bus 92 of FIG. 2 of an APL network. The bus 164 may thus connect the APL combined field and power switch module 314 to various other EMC modules disposed on the base unit 312. In this case, an APL module 350 is inserted into a slot on the base unit 312 and connects to the bus 164 to provide communications between the combined field and power switch 314 and an APL physical layer bus 254 attached to the terminal block associated with the APL EMC module 350. The APL module 350 thus enables communications between the combined APL field and power switch 352 and multiple different field devices 256 on the APL bus 254 and may simply provide marshalling functionality to track when new field devices 256 are added to the bus 254, etc. Moreover, in this example, the combined APL field and power switch module 314 may include the circuitry of a field switch (such as a field switch 86 of FIG. 1) and a power switch (such as the power switch 84 of FIG. 1) and may thereby include a power supply or be connected to an external power supply. Moreover, the APL processing module 314 may provide both power and communications over the bus 164 to the APL EMC module 350 which, in turn, communicates using any desired or supported communication protocol with the field devices 256 using the APL physical layer or bus 254. In this example, because a single field switch 314 is used in the device 300 to support potentially multiple APL insertable modules 350, the maximum number of field devices that are supported by the device 300 is limited to the number supported by a single field switch (e.g., typically 50 when using the APL physical layer). While this configuration reduces the total number of supported field devices on the I/O device 300, it also simplifies the design of the insertable APL modules 350. Of course, the APL modules 314 and 350 may use any desired communication protocol supported by the APL physical layer, including an Ethernet IP protocol, a HART-IP protocol, an OPC UA protocol, or any other packet-based communication protocol.

Figure 7:
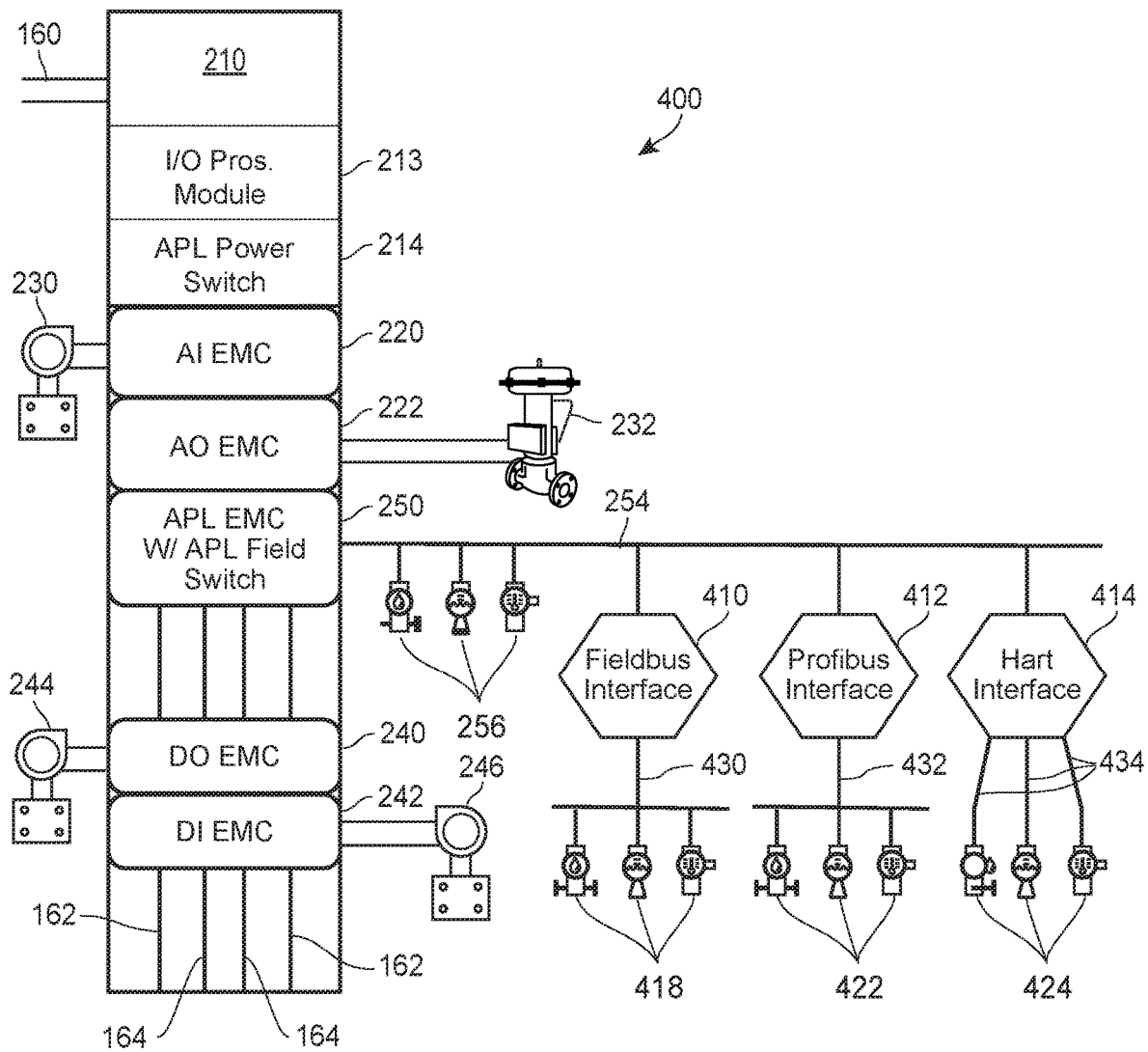
FIG. 7 depicts a schematic diagram of the marshalling device of FIG. 3 configured to support multiple different types of field device communication networks via an APL physical layer by tunneling traditional process control communication protocols in another general IP communication protocol over an advanced physical layer communication network.

FIG. 7 illustrates yet a manner of connecting the I/O device 200 of FIG. 5 to communicate with and support field devices that use multiple different communication protocols via a single APL physical layer. In particular, the input/output device 400, which is configured similarly to the I/O device 200 of FIG. 5, includes the same elements as the device 200 of FIG. 5 including an APL power switch 214, an insertable APL field switch module 250, and a bus 164 that interconnects the power switch 214 and the field switch 250. Additionally, the field switch 250 is illustrated as being connected to a spur line of an APL physical layer bus 254, while a set of IP communication based field devices 256 are connected directly to the APL spur line 254. The field devices 256 may communicate over the line 254 using an APL supported communication protocol, including for example, a general purpose IP protocol, an Ethernet protocol, a HART-IP protocol, an OPC UA protocol, etc. In this embodiment however, as further illustrated in FIG. 7, a fieldbus interface device 410, a PROFIBUS interface device 412 and a HART interface device 414 are connected to the APL spur line 254 and support the APL physical layer at interfaces thereof. In particular, the Fieldbus interface device 410, the PROFIBUS interface device 412 and the HART interface device 414 include Fieldbus, PROFIBUS and HART transducer device blocks that interface with the field devices 418, 422 and 424, respectively, to connect these field devices 418, 420, 422 with the field switch 250 via the APL spur bus 254. Thus, as illustrated in FIG. 7, the Fieldbus interface device 410 is connected via a Fieldbus physical layer (bus or line) 430 to various Fieldbus devices 418, the PROFIBUS interface device 412 is connected via a PROFIBUS physical layer (bus or line) 432 to the various PROFIBUS devices 422, and the HART interface device 424 is connected via HART physical layers (lines) 434 to different HART (or 4-20 ma) field devices 424. In this case, the bus 430 is a Fieldbus physical layer that supports a Foundation Fieldbus communication protocol, the bus 432 is a PROFIBUS compliant physical layer that supports the PROFIBUS communication protocol, and the HART lines 434 are HART compliant physical layers that support the HART and 4-20 ma communication protocols. Additionally, the interface devices 410, 412 and 414 support the Fieldbus, PROFIBUS and HART (or 4-20 ma) communication protocols and operate as gateways to the attached field device networks that use those protocols.

Moreover, in the network of FIG. 7, the interface devices 410, 412 and 414 communicate with the APL field switch 250 via the APL spur line (physical layer) 254 using the same communication protocol as that used for the field devices 256. As an example, the HART-IP protocol may be used on the spur line 254 (and the bus 164). However, any other desired packet-based protocol, such as an Ethernet protocol, an OPC UA protocol, a traditional IP protocol (e.g., one supporting HTML), etc. may be used on the APL physical layer 254. As is known, the HART-IP communication protocol is a non-time sensitive, packet-based protocol that supports IP packets having particular packet types. In this case, the field devices 256 and the interface devices 410, 412 and 414 may communicate directly with the field switch module 250 using the HART-IP protocol. However, the communication packets sent between the interface devices 410, 412 and 414 and the switch 250 may tunnel other types of protocol packets therein to enable communications using other communication protocols within the various sub-networks coupled to the interface devices 410, 412 and 414. In one example, various different HART-IP packets may be sent by devices on the physical layer 254 by being addressed to those devices using the HART-IP packet format. However, the payload of the HART-IP packet may include different types of or format of data depending on the device to or from which the packet is sent. For example, HART-IP payloads being sent to or from the field devices 256 may include data (e.g., HTML data for example) to be used directly by the field devices 256 which may support a traditional or general purpose IP communication protocol. However, HART-IP messages sent to or from the interface devices 410, 412 and 414 may be addressed to the various interface devices 410, 412 or 414 (or to one of the field devices 418, 420, 422 directly), in which case the interface devices 410, 412 and 414 operate as gateways to decode the HART-IP messages and recognize that the message is intended for (or is addressed to) one of the field devices connected to a subnetwork. In these cases, the payload of the HART-IP packet may include a further communication packet configured according to a different communication protocol used in the associated sub-network, such as a Fieldbus protocol, a PROFIBUS protocol, a HART protocol, a CAN protocol, etc. In this case, the interface devices 410, 412, 414 decode the HART-IP message or packet and determine if that the message is for one of the field devices in its subnetwork. To do so, the interface device 410, 412, 414 may decode the header of the HART-IP packet to determine if the HART-IP message is addressed to it or to a field device in its sub-network, and/or may need to decode the payload of the HART-IP packet to determine if the message in the payload of the HART-IP packet is addressed to a field device in its sub-network. If so, the interface device 410, 412, 414 may place the payload of the HART-IP packet onto its sub-network physical layer as a message in the communication protocol used in the sub-network. Likewise, the interface devices 410, 412 and 414 may package messages from one of the field devices (in a protocol used in the sub-network) into the payload field of a HART-IP packet and address that packet to the intended recipient (e.g., to the head-end unit 210 of the device 400 or even the controller that is coupled to the device 400), and place the HART-IP packet on the physical layer 254 using the HART-IP protocol.

Figure 8:
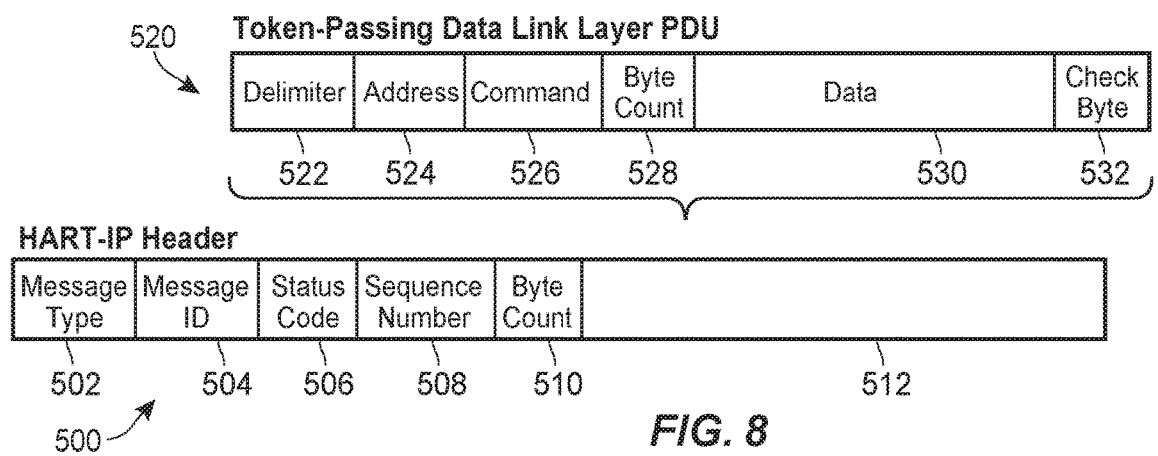
FIG. 8 depicts a packet configuration of a Fieldbus message tunneled into an IP packet of a HART-IP communication protocol.

An example of this protocol tunneling concept is illustrated in FIG. 8, in which a Fieldbus protocol packet (used in the sub-network of the Fieldbus interface device 410) is tunneled within a HART-IP packet that is sent over the APL physical layer 254. In particular, as illustrated in FIG. 8, the header of a HART-IP packet 500 may include a message type field 502, a message ID field 504, a status code field 506, a sequence number field 508, a byte count field 510 and a payload field 512. As noted above, the various HART-IP packets associated with or addressed to different ones of the devices 256 or to the interface devices 410, 412 and 414 may tunnel different types or formats of data within the data payload field 512 of the HART-IP packet 500. Thus, messages addressed to the Fieldbus interface device 410 may tunnel Fieldbus protocol packets in the data or payload field 512 of the HART-IP packet 500. As illustrated in FIG. 8, a Fieldbus protocol packet 520 is being tunneled within the payload field 512 of the HART-IP packet 500. The Fieldbus protocol packet 520 includes a delimiter field 522, an address field 524, a command field 526, a byte count field 528, a data field 530, and a check byte field 532, as called for by the FOUNDATION Fieldbus communication protocol. Thus, the data within the data field 530 of the packet 520 may include FOUNDATION Fieldbus data for a particular field device 418 (as defined by the address field 524) within the sub-network of the interface device 410 as specified by the Fieldbus protocol. In this manner, the Fieldbus packet 520 is tunneled within the HART-IP packet 500 over the APL physical layer 254 and is sent directly as a packet on the Fieldbus physical layer 430. Likewise, the Fieldbus interface device 410 may package Fieldbus packets sent from the field devices 418 within a HART-IP packet and send these messages over the APL physical layer 254 (the switch 250 and the bus 164) to, for example, the head-end unit 210 of the I/O device 400, which may then obtain and decode the Fieldbus packet as would normally occur within a Fieldbus protocol I/O device and communicate the device data to the controller 11. Additionally, it will be understood that PROFIBUS protocol packets and HART protocol packets may be tunneled within the HART-IP packet 500 of FIG. 8 in the same manner, except that the PROFIBUS packet will include a messages as specified by the PROFIBUS protocol and the HART packet will include messages as defined by the HART protocol. Likewise, messages sent to, from or between the devices 256 and other devices on the physical layer 254 and the field switch 250 may include or use the data or payload field 512 in the HART-IP packet in any desired manner and thus may, for example, use a more traditional IP data protocol, such as an HTML data protocol, for that data.

Of course, other types of communication protocols can be used on the physical layer 254 instead of the HART-IP protocol, such as an Ethernet protocol, an OPC UA protocol or any other packet-based protocol, and these protocols may be time sensitive or a non-time sensitive protocols. Likewise, other protocols, such as other process control protocols, could be tunneled within an IP or other packet-based protocol used on the APL physical layer 254. Still further, any number of different protocols could be tunneled within the packets of the protocol used on the APL physical layer 254 so that the APL physical layer 254 can support multiple different communication protocols and devices associated with multiple different communication protocols.

Figure 9:
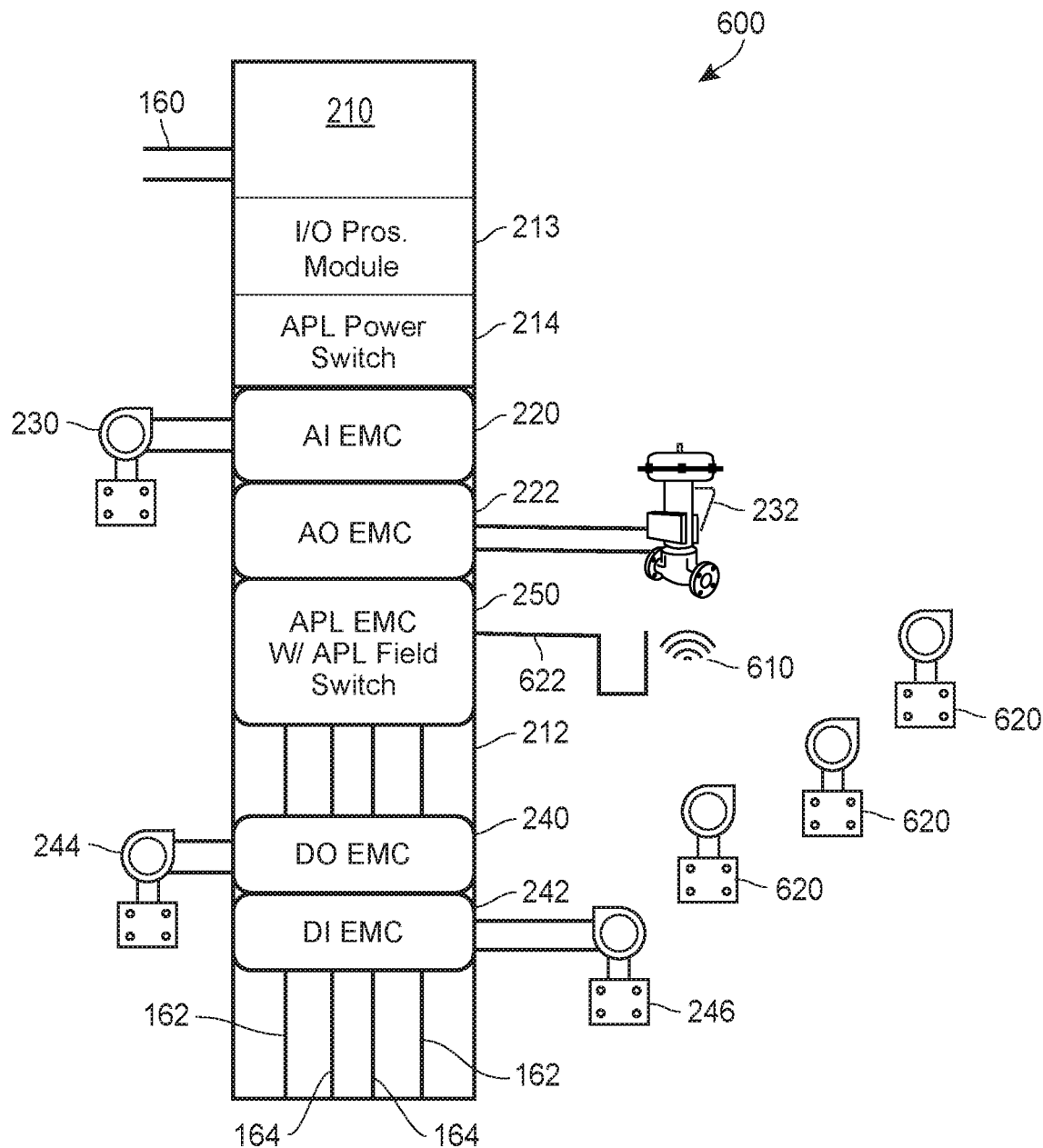
FIG. 9 depicts a schematic diagram of the marshalling device of FIG. 3 configured to support wireless device communications via one or more wireless protocols using an advanced physical layer network.

FIG. 9 illustrates a further input/output device 600 that is similar to the input/output device 200 of FIG. 5 except that, instead of the APL field switch 250 supporting a set of wired devices, the APL field switch 250 supports a wireless network, such as WirelessHART network. In this case, the field switch module 250, which is inserted into the base 212 of the device 600, connects to a wireless transmitter device 610, which transmits signals to various different wireless transmitters or field devices 620. The wireless transmitter device 610 may be a gateway to a wireless network, such as a wireless mesh network, e.g., a WirelessHART network, or may be a gateway to any other type of wireless network. The APL field switch 250 may use the APL physical layer to implement a wired connection 622 between the field switch 250 and the gateway device 610 and may direct communications over the physical layer 622 using any desired IP or packet-based communication protocol. In one example, the field switch 250 may use the HART-IP communication protocol for communications on the bus 622, and the gateway 610 may convert the HART-IP protocol messages into WirelessHART messages in any known or desired manner. Likewise, the gateway 610 may place packets or decode packets received from the wireless field devices 620, and place these packets (or otherwise convert these signals) into a HART-IP communication protocol or any other IP-based or packet-based protocol to be sent to the field switch 250 over the APL physical layer 622, and from there via the bus 164 to the power switch 252 and to the head end unit 210.

Figure 10:
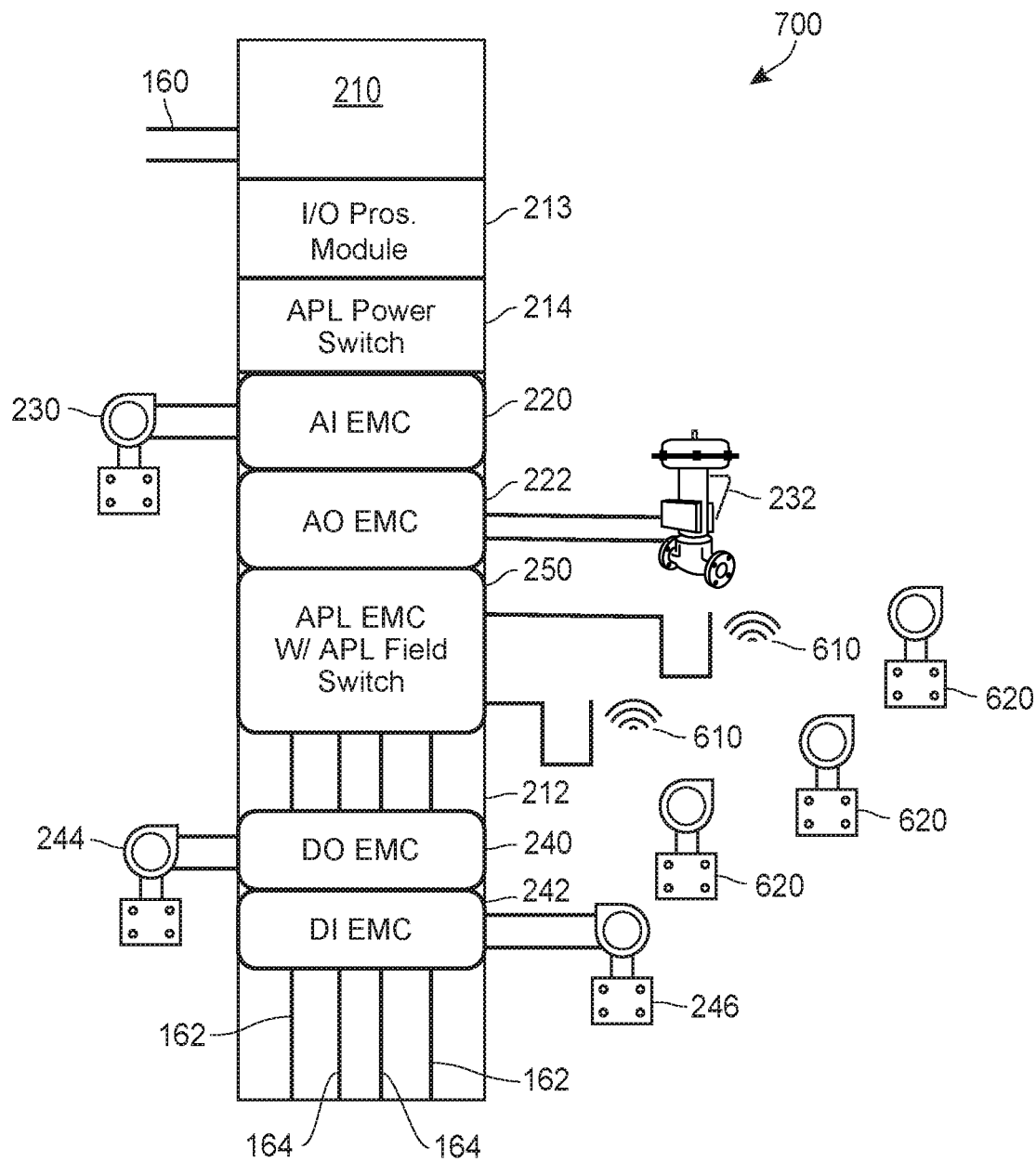
FIG. 10 depicts a schematic diagram of the marshalling device of FIG. 3 configured to support high security applications via wireless device communications using an advanced physical layer network.

FIG. 10 illustrates a further embodiment of an input/output device 700 that is very similar to the device 600 of FIG. 9, except that the APL field switch 250 supports multiple wireless transmitters 610 that are connected into a wireless network comprising the field devices 620. The wireless interface devices 610 may be redundant devices, and thus the field switch 250 may send the same messages or receive the same messages from those redundant devices in order to provide redundancy within the mesh network of field devices 620. The configuration of FIG. 10 may be used in, for example, security implementation level two (SIL 2) applications, in which redundancy is required. Of course, similar to the description of the embodiment of FIG. 9, the field switch 250 may use any desired protocol on the APL physical layer 622 to provide communications between the wireless gateway devices 610 and the head end unit 210. Moreover, in the embodiment of FIG. 10, the HART devices, such as wireless mesh network field devices 620, may have their protocols tunneled within an SIL 2 suitable protocol.

Figure 11:
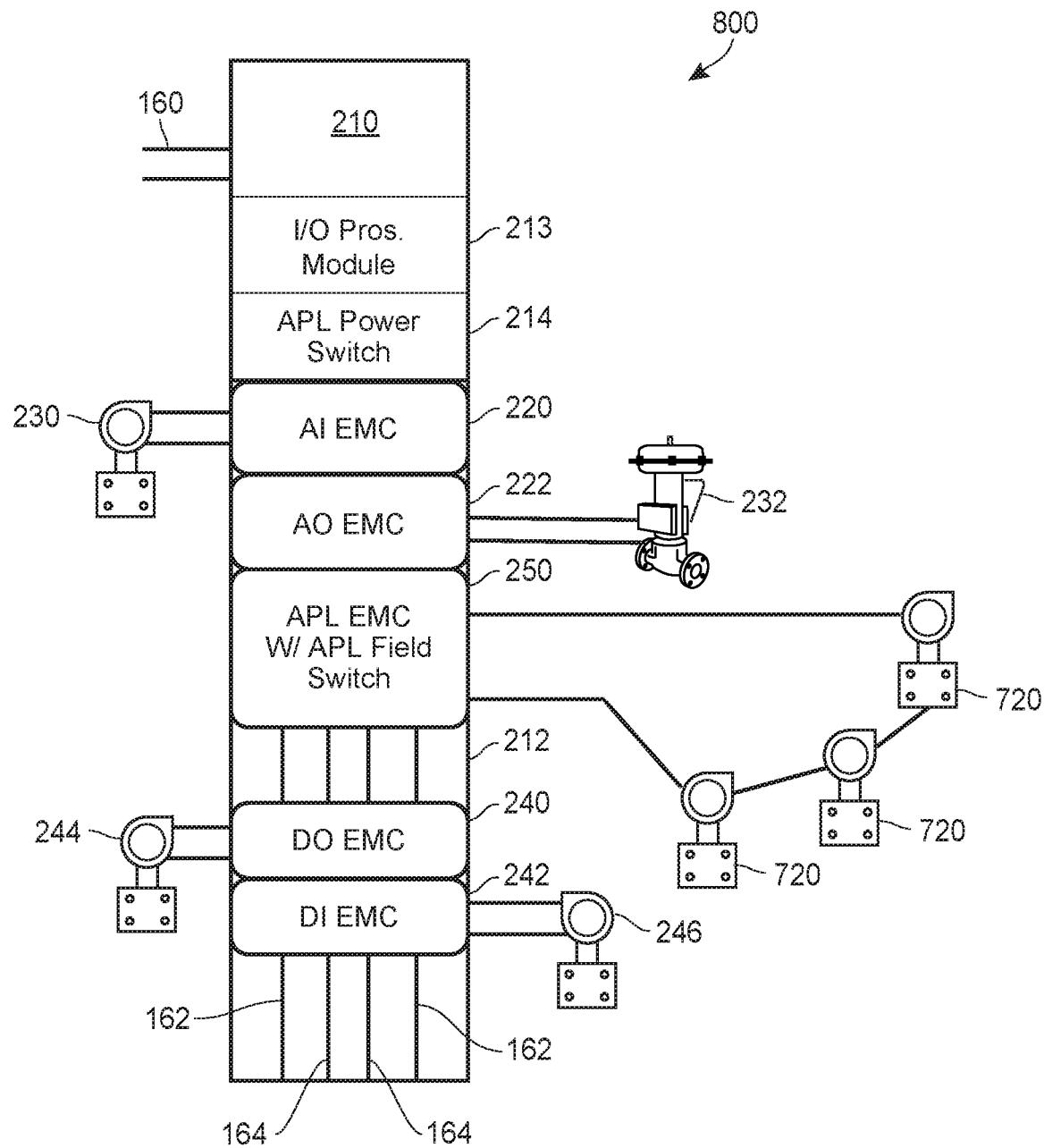
FIG. 11 depicts a schematic diagram of the marshalling device of FIG. 3 configured to support high security applications via wired device communications using an advanced physical layer.

FIG. 11 illustrates a wired SIL 2 application in which an input/output device 800 has a field switch module 250 connected via wired devices and wired links to various different wireless transmitters or devices 720, which may be field devices within a wireless mesh network that is not being directly supported by the input/output device 700 but in which the device 700 may be used as a redundant connection into the wireless network, or may be used to obtain information from devices in the wireless network without effecting the operation of the communication network within that wireless network. In this manner, a user can create an addressable fire and gas system, for example, using regular hard wired devices connected in a loop, while still being within an SIL 2 implementation using an SIL 2 protocol.

While the input/output devices described herein are generally described as using an APL physical layer to support more traditional IP based communication networks, these I/O devices could use any other physical layer that supports any general purpose IP based communication protocol, such as an Ethernet physical layer, etc. Still further, the I/O devices described herein could support any desired combination of physical layers and communication protocols, including combinations of one or more traditional process communication physical layers (e.g., HART, FOUNDATION Fieldbus, PROFIBUS, CAN, etc.) with one or more general purpose IP physical layers (e.g., the APL physical layer, an Ethernet physical layer, etc.) and protocols (IP based protocols, Ethernet protocols, HART-IP protocols, OPC UA protocols), etc. Moreover, the I/O devices described herein could support combinations of two or more traditional process control physical layers and communication protocols (e.g., the HART and Fieldbus physical layers and protocols), or combinations of two or more traditional or general purpose IP physical layers and protocols.

Thus, as can be seen, the input/output device described herein enables or provides support for field device communications using a single input/output device that supports multiple different physical layers, and that supports the use of different communication protocols via the different physical layers. This input/output device there by enables new types of field devices (e.g., field devices that communicate using more traditional IP based communications) to be easily and seamlessly supported within a process plant. Moreover, this I/O device enables different types of field devices (i.e., field devices that use different physical layers and different communication protocols) to be integrated under and supported by the same I/O device. Still further, because this I/O device uses hardware configurable modules to connect field devices and field device networks to the I/O device, the field device networks can be configured on the fly so that different physical layers that support different communication protocols can be connected to the I/O device at any desired location or terminal block on the I/O device, an appropriate hardware module or EMC module appropriate for the communication protocol and physical layer can be inserted into the slot associated with the terminal block and the EMC module can automatically detect the type and identity of the field devices now connected to the EMC module via the physical layer. The EMC module can then provide this configuration information to the head-end unit of the I/O device which can register the correct path and communication protocol to use to communicate with the detected field devices and can provide this configuration information to the controller which can use this path and protocol information to communicate with the field devices. Moreover, the controller can provide this configuration information to a configuration database and populate that database with field device information as the field devices are connected to the I/O device and the configuration information is detected. Still further, while many of the example I/O devices described herein are illustrated as including two or more I/O processing modules, with one processing module generally being used to support one type of physical layer and communication protocol, the I/O devices described herein could have a single processing module associated therewith that connects to different field devices via two or more internal busses and this single I/O processing module may support multiple (two, three, etc.) different physical layers and communication protocols.

When implemented in software, any of the applications, modules, etc. described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The particular features, structures, and/or characteristics of any specific embodiment may be combined in any suitable manner and/or in any suitable combination with one and/or more other embodiments, including the use of selected features with or without corresponding use of other features. In addition, many modifications may be made to adapt a particular application, situation and/or material to the essential scope or spirit of the present invention. It is to be understood that other variations and/or modifications of the embodiments of the present invention described and/or illustrated herein are possible in light of the teachings herein and should be considered part of the spirit or scope of the present invention. Certain aspects of the invention are described herein as exemplary aspects.

What is claimed is:

1. An input/output device for use in a process control system to communicatively couple a plurality of field devices to a process controller, the input/output device comprising:
    a head-end unit including a first base unit and one or more processor modules disposed on the first base unit;
    a first bus disposed in the first base unit and communicatively coupled to the one or more processor modules, the first bus connected to an external connector adapted to be communicatively coupled to the process controller;
    a second base unit communicatively coupled to the first base unit, the second base unit including:
        a plurality of marshalling units disposed in slots thereon, each marshalling unit including a memory and a processor for performing communications; and
        a different terminal block associated with each of the marshalling units, wherein each terminal block accepts wiring to be used to communicatively couple the terminal block to one or more of the field devices; and
    second and third busses disposed on the first and second base units, wherein each of the second and third busses communicatively couple the one or more processor modules to each of the slots in which the plurality of marshalling units are disposed;
    wherein a first one of the marshalling units is associated with and performs communications with a set of one or more field devices using a first type of physical layer and a second one of the marshalling units is associated with and performs communications with a different set of one or more field devices using a second type of physical layer different than the first type of physical layer while the first one of the marshalling units performs communications with the set of one or more field devices using the first type of physical layer, and wherein the terminal block associated with the first marshalling unit accepts the first type of physical layer and the terminal block associated with the second marshalling unit accepts the second type of physical layer.

2. The input/output device of claim 1, wherein the first marshalling unit supports communications using a first communication protocol via the first type of physical layer and the second marshalling unit supports communications using a second communication protocol via the second type of physical layer, the second communication protocol being different than the first communication protocol.

3. The input/output device of claim 2, wherein the first communication protocol is a general purpose IP communication protocol and the second communication protocol is a process control communication protocol.

4. The input/output device of claim 3, wherein the first communication protocol is an Ethernet communication protocol and the second communication protocol is a HART communication protocol.

5. The input/output device of claim 3, wherein the first communication protocol is a HART-IP communication protocol or an OPC UA communication protocol.

6. The input/output device of claim 1, wherein the second bus supports communications between the first marshalling unit and the processor module using the first physical layer and the third bus supports communications between the second marshalling unit and the processor module using the second physical layer.

7. The input/output device of claim 1, wherein the head-end unit includes a power supply for providing power for field devices that use a first communication protocol via the first physical layer.

8. The input/output device of claim 1, wherein the head-end unit includes a first power supply for providing power for field devices that use a first communication protocol via the first physical layer, and includes a second power supply for providing power for field devices that use a second communication protocol via the second physical layer.

9. The input/output device of claim 1, wherein the head-end unit includes a first switch conforming to the first physical layer and the marshalling unit includes a second switch conforming to the first physical layer.

10. The input/output device of claim 1, wherein the head-end unit includes a power supply and a switch conforming to the first physical layer.

11. The input/output device of claim 1, wherein the marshalling units are insertable and removable from the second base unit, and wherein each of the marshalling units communicatively couple to one and only one of the second or third busses and to an associated terminal block when inserted into the second base unit.

12. The input/output device of claim 11, wherein the removable marshalling units can be inserted into and removed from the slots.

13. The input/output device of claim 1, wherein the processor module supports communications on both the second and third busses using different communication protocols.

14. The input/output device of claim 1, wherein the processor module includes a first processor unit to communicate with field devices via the second bus and one or more marshalling units coupled to the second bus and a second processor unit to communicate with field devices via the third bus and one or more marshalling units coupled to the third bus.

15. The input/output device of claim 1, wherein the processor module includes a first processor unit to communicate with field devices via the second bus and one or more marshalling units coupled to the second bus using a first communication protocol and a second processor unit to communicate with field devices via the third bus and one or more marshalling units coupled to the third bus using a second communication protocol that is different than the first communication protocol.

16. An input/output device for use in a process control system to communicatively couple a plurality of field devices to a process controller, the input/output device comprising:
- a base;
- a head-end unit disposed on the base, the head-end unit including one or more processor modules;
- a first bus disposed on the base and communicatively coupled to the one or more processor modules, the first bus connected to an external connector on the base that is adapted to communicatively couple the first bus to the process controller;
- a plurality of slots disposed on the base;
- a plurality of terminal blocks, with each terminal block being communicatively coupled to a different one of the plurality of slots and wherein each terminal block accepts wiring to be used to communicatively couple the terminal block to one or more of the field devices;
- a second bus disposed on the base that communicatively couples the one or more processor modules to each of the plurality of slots; and
- a plurality of marshalling units, wherein each of the plurality of marshalling unit includes a memory and a processor for performing communications and wherein each of the plurality of marshalling units is insertable into any of the slots, such that, when inserted into one of the slots, a marshalling unit communicatively couples to one of the terminal blocks and to the second bus;
- wherein a first one of the marshalling units is associated with and performs communications with a set of one or more of the field devices using a first type of physical layer and a second one of the marshalling units is associated with and performs communications with a different set of one or more of the field devices using a second type of physical layer that is different than the first type of physical layer while the first one of the marshalling units performs communications with the set of one or more field devices using the first type of physical layer, and wherein when the first one of the marshalling units is inserted into a first one of the slots, the terminal block associated with the first one of the slots accepts the first type of physical layer and wherein when the second one of the marshalling units is inserted into a second one of the slots, the terminal block associated with the second one of the slots accepts the second type of physical layer.

17. The input/output device of claim 16, wherein the second bus includes a first sub-bus coupled between the one or more processor modules and each of the slots and includes a second sub-bus coupled between the one or more processor modules and each of the slots.

18. The input/output device of claim 17, wherein the first sub-bus supports communications using the first physical layer and the second sub-bus supports communications using the second physical layer.

19. The input/output device of claim 17, wherein the one or more processor modules includes a first processor unit that communicates with the field devices coupled to the input/output device via the first physical layer and includes a second processor unit that communicates with the field devices coupled to the input/output device via the second physical layer.

20. The input/output device of claim 19, wherein the first processor unit communicates with the field devices coupled to the input/output device via the first physical layer using a first communication protocol and wherein the second processor unit communicates with the field devices coupled to the input/output device via the second physical layer using a second communication protocol that is different than the first communication protocol.

21. The input/output device of claim 20, wherein the first communication protocol is a general purpose IP communication protocol and the second communication protocol is a process control communication protocol.

22. The input/output device of claim 17, wherein the first one of the marshalling units when inserted into any one of the plurality of slots, communicatively connects with the first sub-bus to support the first physical layer and the second one of the marshalling units, when inserted into any one of the plurality of slots connects to the second sub-bus to support the second physical layer.

23. The input/output device of claim 16, wherein the first marshalling unit supports communications using a first communication protocol via the first type of physical layer and the second marshalling unit supports communications using a second communication protocol via the second type of physical layer, the second communication protocol being different than the first communication protocol.

24. The input/output device of claim 16, wherein the head-end unit includes a power supply for providing power for field devices that use a first communication protocol via the first physical layer.

25. The input/output device of claim 16, wherein the head-end unit includes a first power supply for providing power for field devices that use a first communication protocol via the first physical layer, and includes a second power supply for providing power for field devices that use a second communication protocol via the second physical layer.

26. The input/output device of claim 16, wherein the head-end unit includes a first switch for use on the first physical layer and one of the marshalling units is communicatively connected to the first switch via the second bus and includes a second switch for use on the first physical layer.

27. The input/output device of claim 16, wherein the head-end unit includes a power supply and a switch that conforms with the first physical layer and one of the marshalling units is communicatively connected to the power supply and switch in the head-end unit via the second bus and performs communication between one or more field devices and the power supply and switch using the first physical layer.

28. A process control system for use in controlling a process plant, comprising:
- a process controller;
- a plurality of field devices for performing control functions with the process plant, wherein a first one of the plurality of field devices uses a first communication protocol that uses a first type of physical layer and a second one of the plurality of field devices uses a second communication protocol that uses a second type of physical layer, wherein the first type of physical layer and the second type of physical layer are different types of physical layers and wherein the first communication protocol is different than the second communication protocol;

an input/output device coupled between the process controller and each of the plurality of field devices, the input/output device including,
  a base;
  a head-end unit disposed on the base, the head-end unit including one or more input/output processor modules;
  a first bus disposed on the base and communicatively coupled between the one or more input/output processor modules and the process controller;
  a plurality of slots disposed on the base;
  a plurality of terminal blocks disposed on the base, each terminal block being communicatively coupled to a different one of the plurality of slots and wherein each terminal block accepts wiring to be used to communicatively couple the terminal block to one or more of the plurality of field devices;
  a second bus disposed on the base that communicatively couples the one or more input/output processor modules to each of the plurality of slots; and
  a plurality of marshalling units, wherein each of the plurality of marshalling units includes a memory and a processor for performing communications and wherein each of the plurality of marshalling units is insertable into one of the slots, such that, when inserted into one of the slots, a marshalling unit communicatively couples to one of the terminal blocks and to the second bus;
  wherein a first one of the marshalling units is associated with and performs communications with the first one of the field devices using the first type of physical layer and a second one of the marshalling units is associated with and performs communications with the second one of the field devices using the second type of physical layer while the first one of the marshalling units performs communications with the set of one or more field devices using the first type of physical layer, and wherein when the first one of the marshalling units is inserted into a first one of the slots, the terminal block associated with the first one of the slots accepts the first type of physical layer and wherein when the second one of the marshalling units is inserted into a second one of the slots, the terminal block associated with the second one of the slots accepts the second type of physical layer.

29. The process control system of claim 28, wherein the first physical layer is a physical layer that supports a general purpose IP communication protocol and the second physical layer is a physical layer that supports a process control communication protocol.

30. The process control system of claim 29, wherein the first communication protocol is an Ethernet communication protocol and the second communication protocol is a HART communication protocol.

31. The process control system of claim 28, wherein each of the terminal blocks is configured to accept wiring for both the first and the second physical layers.

32. The process control system of claim 28, wherein the second bus includes a first sub-bus and second sub-bus, wherein the first sub-bus supports communications between the first marshalling unit and the one or more input/output processor modules using the first physical layer and second sub-bus supports communications between the second marshalling unit and the one or more input/output processor modules using the second physical layer.

33. The process control system of claim 32, wherein the marshalling units are insertable and removable from the base unit, and wherein each of the marshalling units communicatively couples to one and only one of the first or the second sub-busses and communicatively couples to an associated terminal block when inserted into a slot on the base unit.

34. The process control system of claim 32, wherein the one or more input/output processor modules supports communications on both the first and second sub-busses using different communication protocols.

35. The process control system of claim 32, wherein the one or more input/output processor module includes a first processor unit to communicate with field devices via the first sub-bus and the input/output device includes one or more marshalling units coupled to the first sub-bus and wherein the one or more input/output processor modules includes a second processor unit to communicate with field devices via the second sub-bus and the input/output device includes one or more marshalling units coupled to the second sub-bus.

36. The process control system of claim 32, wherein the one or more input/output processor modules includes a first processor unit to communicate with field devices via the first sub-bus and one or more marshalling units coupled to the first sub-bus using a first communication protocol, and wherein the one or more input/output processor modules includes a second processor unit to communicate with field devices via the second sub-bus and one or more marshalling units coupled to the second sub-bus using a second communication protocol that is different than the first communication protocol.

37. The process control system of claim 28, wherein the head-end unit includes a power supply for providing power for a first communication protocol via the first physical layer.

38. The process control system of claim 28, wherein the head-end unit includes a first power supply for providing power for field devices that use a first communication protocol, wherein the marshalling unit includes a memory and a processor for performing communications via the first physical layer, and includes a second power supply for providing power for field devices that use a second communication protocol via the second physical layer.

39. The process control system of claim 28, wherein the head-end unit includes a first switch for use on the first physical layer and one of the marshalling units includes a second switch for use on the first physical layer.

40. The process control system of claim 28, wherein the head-end unit includes a power supply and a switch conforming to the first physical layer.

41. A process control system for use in controlling a process plant, comprising:
  a process controller;
  a plurality of field devices for performing control functions within the process plant, wherein a first set of the plurality of field devices uses a first communication protocol that uses a first type of physical layer and a second set of the plurality of field devices uses a second communication protocol that uses a second type of physical layer, wherein the first type of physical layer and the second type of physical layer are different types of physical layers and wherein the first communication protocol is different than the second communication protocol;
  an input/output device coupled between the process controller and each of the plurality of field devices, the input/output device including,
    a base;

a head-end unit disposed on the base, the head-end unit including one or more input/output processor modules;

a first bus disposed on the base and communicatively coupled to the one or more input/output processor modules, the first bus communicatively coupled to the process controller;

a second bus and a third bus disposed on the base, the second bus and the third bus being communicatively coupled to the one or more input/output processor modules and to each of a plurality of slots on the base;

a plurality of marshaling units disposed within the slots on the base, wherein each of the plurality of marshalling units includes a memory and a processor for performing communications and wherein each of the plurality of marshalling unit is communicatively coupled to the one or more input/output processor modules via either the second bus or the third bus; and a plurality of terminal blocks disposed on the base, each terminal block being communicatively coupled to a different one of the plurality of marshalling units and wherein each terminal block accepts wiring to be used to communicatively couple the terminal block to one or more of the plurality of field devices;

wherein a first one of the marshalling units is associated with and performs communications with at least one of the first set of field devices using the first type of physical layer and a second one of the marshalling units is associated with and performs communications with at least one of the second set of field devices using the second type of physical layer while the first one of the marshalling units performs communications with the set of one or more field devices using the first type of physical layer.

42. The process control system of claim 41, wherein the first marshalling unit communicates with the one of the first set of field devices using the first communication protocol and the second marshalling unit communicates with the one of the second set of field devices using the second communication protocol.

43. The process control system of claim 41, wherein each of the marshalling units is adapted to be insertably mounted in one of the slots to connect the marshalling unit to one of the second or third busses and to one of the terminal blocks.

44. The process control system of claim 43, wherein each slot is communicatively coupled to each of the second and third busses.

45. The process control system of claim 44, wherein the second bus supports communications between the first marshalling unit and one of the one or more input/output processor modules using the first physical layer and third bus supports communications between the second marshalling unit and one of the one or more input/output processor modules using the second physical layer.

46. The process control system of claim 44, wherein the one or more input/output processor modules supports communications on the second and third busses using different communication protocols.

47. The process control system of claim 44, wherein the one or more input/output processor modules includes a first processor unit to communicate with field devices via the second bus and the input/output device includes one or more marshalling units coupled to the second bus and wherein the one or more input/output processor modules includes a second processor unit to communicate with field devices via the third bus and the input/output device includes one or more marshalling units coupled to the third bus.

48. The process control system of claim 44, wherein the one or more input/output processor modules includes a first processor unit to communicate with field devices via the second bus using a first communication protocol and the input/output device includes one or more marshalling units coupled to the second bus to communicate with one or more of the field devices using the first communication protocol, and wherein the one or more input/output processor modules includes a second processor unit to communicate with one or more of the field devices via the third bus using a second communication protocol and the input/output device includes one or more marshalling units coupled to the third bus to communicate with the one or more of the field devices using the second communication protocol, wherein the first communication protocol is different than the second communication protocol.

49. The process control system of claim 41, wherein the head-end unit includes a power supply for providing power for a first communication protocol via the first physical layer.

50. The process control system of claim 41, wherein the head-end unit includes a first power supply for providing power for field devices that use the first communication protocol via the first physical layer, and includes a second power supply for providing power for field devices that use the second communication protocol via the second physical layer.

51. An input/output device for use in providing communications between an external device and a plurality of field devices, comprising:

a base;

a head-end unit disposed on the base, the head-end unit including a processor module;

a first bus disposed on the base and communicatively coupled to the processor module, the first bus connected to an external connector on the base that is adapted to communicatively couple the first bus to the external device;

a plurality of slots disposed on the base;

a plurality of terminal blocks, with each terminal block being communicatively coupled to a different one of the plurality of slots and wherein each terminal block accepts wiring to be used to communicatively couple the terminal block to one or more of the field devices;

a second bus disposed on the base that communicatively couples the processor module to each of the plurality of slots; and a plurality of marshalling units, wherein each of the plurality of marshalling units includes a memory and a processor for performing communications and wherein each of the plurality of marshalling units is insertable into any of the slots, such that, when inserted into one of the slots, a marshalling unit communicatively couples to one of the terminal blocks and to the second bus;

wherein a first one of the marshalling units performs communications with a set of one or more of the field devices via one of the terminal blocks using a first type of physical layer that supports a general purpose IP communication protocol and a second one of the marshalling units performs communications with a different set of one or more of the field devices via a different one of the terminal blocks using another physical layer that supports a general purpose IP communication protocol.

52. The input/output device of claim 51, wherein the processor module includes a first processor unit that communicates with the field devices coupled to the input/output device via the first type of physical layer using a first communication protocol.

53. The input/output device of claim 52, wherein the first communication protocol is a general purpose IP communication protocol.

54. The input/output device of claim 52, wherein the first communication protocol is an Ethernet communication protocol.

55. The input/output device of claim 52, wherein the first communication protocol is a HART-IP communication protocol.

56. The input/output device of claim 52, wherein the first communication protocol is an OPC UA communication protocol.

57. The input/output device of claim 51, wherein the first type of physical layer is an advanced physical layer (APL) physical layer.

58. The input/output device of claim 51, wherein the first type of physical layer is an Ethernet physical layer.

59. The input/output device of claim 51, wherein the head-end unit includes a power supply for providing power for field devices that use a first communication protocol via the first type of physical layer.

60. The input/output device of claim 51, wherein the head-end unit includes a first switch conforming to the first type of physical layer and one of the first or second marshalling units includes a second switch conforming to the first type of-physical layer.

61. The input/output device of claim 51, wherein the head-end unit includes a power supply and a switch conforming to the first type of physical layer.

62. The input/output device of claim 51, wherein the processor module is removably mounted on the base.

63. The input/output device of claim 51, wherein the first one of the marshalling units is communicatively coupled, via one of the terminal blocks, to one or more field device interface devices via the first type of physical layer and uses a first communication protocol to communicate with the one or more field device interface devices, wherein one of the field device interface devices is coupled to one or more field devices via a second type of physical layer different than the first type of physical layer.

64. The input/output device of claim 63, wherein the one of the field device interface devices is communicatively coupled to the one or more field devices via the second type of physical layer and communicates to the one or more field devices over the second type of physical layer via a second communication protocol different than the first communication protocol.

65. The input/output device of claim 64, wherein the second communication protocol is a process control communication protocol.

66. The input/output device of claim 65, wherein the second communication protocol is one of a HART, Fieldbus, PROFIBUS or CAN communication protocol.

67. The input/output device of claim 64, wherein the first one of the marshalling units tunnels communication packets configured according to the second communication protocol within communication packets of the first communication protocol over the first type of physical layer that couples the first one of the marshalling units to the field device interface device.

68. The input/output device of claim 64, wherein the first one of the marshalling units communicates directly with one or more further field devices coupled to the first type of physical layer using the first communication protocol.

69. The input/output device of claim 51, wherein the first marshalling unit is coupled to one or more of the field devices via a first type of physical layer that includes a wireless communication link.

70. The input/output device of claim 51, wherein the first marshalling unit is coupled to one or more of the field devices via a wired connection according to the first type of physical layer and a wireless gateway, wherein the wireless gateway is configured to communicate with one or more field devices via a wireless communication physical layer.

71. The input/output device of claim 70, wherein the wireless communication physical layer conforms to the first type of physical layer.

72. A field device access system for use in communicating with one or more field devices in a process plant, the field devices being coupled to a process controller, comprising:
a plurality of field devices for performing control functions with the process plant, wherein a first one of the plurality of field devices uses a first communication protocol that uses a first type of physical layer and a second one of the plurality of field devices uses a second communication protocol that uses a second type of physical layer, wherein the first type of physical layer and the second type of physical layer are different types of physical layers and wherein the first communication protocol is different than the second communication protocol;
an input/output device coupled between the process controller and each of the plurality of field devices, the input/output device including,
a base;
a head-end unit disposed on the base, the head-end unit including one or more input/output processor modules;
a first bus disposed on the base and communicatively coupled between the one or more input/output processor modules and an external device;
a plurality of slots disposed on the base;
a plurality of terminal blocks disposed on the base, each terminal block being communicatively coupled to a different one of the plurality of slots and wherein each terminal block accepts wiring to be used to communicatively couple the terminal block to one or more of the plurality of field devices;
a second bus disposed on the base that communicatively couples the one or more input/output processor modules to each of the plurality of slots; and
a plurality of marshalling units, wherein each of the plurality of marshalling units includes a memory and a processor for performing communications and wherein each of the plurality of marshalling units is insertable into one of the slots, such that, when inserted into one of the slots, a marshalling unit communicatively couples to one of the terminal blocks and to the second bus;
wherein a first one of the marshalling units is associated with and performs communications with the first one of the field devices using the first type of physical layer and a second one of the marshalling units is associated with and performs communications with the second one of the field devices using the second type of physical layer while the first one of the marshalling units performs communications with the first one of the field devices using the first type of physical layer, and wherein when the first one of the marshalling units is inserted into a first one of the slots, the terminal block associated with the first one of the slots accepts the first type of physical layer and wherein when the second one of the marshalling units is inserted into a second one of the slots, the terminal block associated with the second one of the slots accepts the second type of physical layer.

73. The field device access system of claim 72, wherein the external device is a device in a monitoring system.

74. The field device access system of claim 72, wherein the external device is a device in an asset management system.

75. The field device access system of claim 72, wherein the external device is the process controller.

76. The field device access system of claim 72, further including a further bus disposed on the base and communicatively coupled between the one or more input/output processor modules and the process controller.

77. The field device access system of claim 72, wherein the first one of the marshalling units performs communications with the first one of the field devices using the first type of physical layer and using an internet protocol communication protocol.

78. The field device access system of claim 72, wherein the first one of the marshalling units performs communications with the first one of the field devices using the first type of physical layer and using a communication protocol that uses publish/subscribe messaging.

79. The field device access system of claim 72, wherein the first one of the marshalling units performs communications with the first one of the field devices using the first type of physical layer and using a communication protocol that uses response/request commands.

80. The field device access system of claim 72, wherein the first one of the marshalling units performs communications with the first one of the field devices using the first type of physical layer and using a communication protocol that uses device addressing within device messages.

81. A field device access system for use in communicating with one or more field devices in a process plant, the field devices being coupled to a process controller and configured to perform control functions with the process plant, comprising:
an input/output device coupled between the process controller and each of the plurality of field devices, the input/output device including,
a base;
a head-end unit disposed on the base, the head-end unit including one or more input/output processor modules;
a first bus disposed on the base and communicatively coupled between the one or more input/output processor modules and an external device;
a plurality of slots disposed on the base;
a plurality of terminal blocks disposed on the base, each terminal block being communicatively coupled to a different one of the plurality of slots and wherein each terminal block accepts wiring to be used to communicatively couple the terminal block to one or more of the plurality of field devices;
a second bus disposed on the base that communicatively couples the one or more input/output processor modules to each of the plurality of slots; and
a plurality of marshalling units, wherein each of the plurality of marshalling units includes a memory and a processor for performing communications and wherein each of the plurality of marshalling units is insertable into one of the slots, such that, when inserted into one of the slots, a marshalling unit communicatively couples to one of the terminal blocks and to the second bus, wherein each of the marshalling units performs communications with one or more field devices, via one of the terminal blocks, using a physical layer that supports general purpose internet protocol (IP) communications and performs communications with the one or more field devices using an IP communication protocol.

82. The field device access system of claim 81, wherein the external device is a device in a monitoring system.

83. The field device access system of claim 81, wherein the external device is a device in an asset management system.

84. The field device access system of claim 81, wherein the external device is the process controller.

85. The field device access system of claim 81, further including a further bus disposed on the base and communicatively coupled between the one or more input/output processor modules and the process controller.

86. The field device access system of claim 81, wherein at least one of the marshalling units communicates with the one or more field devices using an IP communication protocol that uses publish/subscribe messaging.

87. The field device access system of claim 81, wherein at least one of the marshalling units performs communications with the one or more field devices using an IP communication protocol that uses response/request commands.

88. The field device access system of claim 81, wherein at least one of the marshalling units performs communications with the one or more field devices using an IP communication protocol that uses device addressing within device messages.

89. The field device access system of claim 81, wherein the physical layer is one of an Ethernet physical layer or an advanced physical layer (APL).

* * * * *

UNITED STATES PATENT AND TRADEMARK OFFICE
CERTIFICATE OF CORRECTION

PATENT NO. : 11,734,213 B2
APPLICATION NO. : 16/573380
DATED : August 22, 2023
INVENTOR(S) : Mark J. Nixon et al.

It is certified that error appears in the above-identified patent and that said Letters Patent is hereby corrected as shown below:

In the Specification

At Column 4, Line 24, "(HART," should be -- (HART®, --.

At Column 4, Lines 24-25, "WirelessHART, FOUNDATION" should be -- WirelessHART®, FOUNDATION® --.

At Column 5, Line 62, "descriptions" should be -- description --.

At Column 18, Line 42, "on at" should be -- at --.

At Column 18, Line 64, "and or" should be -- and/or --.

At Column 19, Line 23, "152 (EMCs)" should be -- (EMCs) 152 --.

At Column 20, Line 28, "may be conformed" should be -- may conform --.

At Column 20, Line 30, "use" should be -- uses --.

At Column 21, Line 62, "(such an" should be -- (such as --.

At Column 25, Line 23, "of or" should be -- or --.

At Column 25, Line 43, "if that the" should be -- if the --.

At Column 26, Line 36, "messages" should be -- message --.

At Column 28, Line 12, "there by" should be -- thereby --.

Signed and Sealed this
Third Day of February, 2026

John A. Squires
*Director of the United States Patent and Trademark Office*

In the Claims

At Column 30, Line 45, "couple" should be -- couples --.

At Column 37, Line 31, "of-physical" should be -- of physical --.